(12) United States Patent
Kawashima

(10) Patent No.: US 11,740,498 B2
(45) Date of Patent: Aug. 29, 2023

(54) LIQUID CRYSTAL DISPLAY DEVICE COMPRISING AN ELASTIC COMPONENT THAT ENGAGES WITH A SIDE WALL OF A CASE

(71) Applicant: Shanghai Tianma Micro-Electronics Co., Ltd., Shanghai (CN)

(72) Inventor: Koji Kawashima, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/074,318

(22) Filed: Dec. 2, 2022

(65) Prior Publication Data

US 2023/0204995 A1 Jun. 29, 2023

(30) Foreign Application Priority Data

Dec. 24, 2021 (JP) ................................. 2021-211444

(51) Int. Cl.
G02F 1/1333 (2006.01)
(52) U.S. Cl.
CPC ................................. *G02F 1/13332* (2021.01)
(58) Field of Classification Search
CPC ................................................ G02F 1/133328
See application file for complete search history.

(56) References Cited

U.S. PATENT DOCUMENTS

| 2012/0050640 | A1* | 3/2012 | Yasui | G02F 1/133308 349/60 |
| 2013/0242227 | A1* | 9/2013 | Zhang | G02F 1/133308 349/60 |
| 2013/0250203 | A1* | 9/2013 | Zhou | G02F 1/133608 362/624 |
| 2013/0258231 | A1* | 10/2013 | Li | G02F 1/133308 349/58 |
| 2014/0022487 | A1* | 1/2014 | Wang | G02F 1/133308 349/58 |
| 2014/0104504 | A1* | 4/2014 | Kuwajima | H05K 5/02 348/843 |

FOREIGN PATENT DOCUMENTS

| JP | 10-022665 A | 1/1998 |
| JP | 2020-053204 A | 4/2020 |

* cited by examiner

*Primary Examiner* — Paul C Lee
(74) *Attorney, Agent, or Firm* — Sughrue Mion, PLLC

(57) ABSTRACT

A backlight unit includes a case having a bottom plate and a side wall, an optical component placed inside the case, and an elastic component that engages with the side wall of the case, making contact with the optical component. A side wall of a front bezel is located outside the side wall of the case. The elastic component includes an outer portion. The outer portion is positioned between an inner surface of the side wall of the front bezel and an outer surface of the side wall of the case, makes contact with the inner surface of the side wall of the front bezel and the outer surface of the side wall of the case, and presses the inner surface of the side wall of the front bezel and the outer surface of the side wall of the case along an in-plane direction of the display area.

9 Claims, 18 Drawing Sheets

LIQUID CRYSTAL DISPLAY DEVICE COMPRISING AN ELASTIC COMPONENT THAT ENGAGES WITH A SIDE WALL OF A CASE

CROSS-REFERENCE TO RELATED APPLICATIONS

This non-provisional application claims priority under 35 U.S.C. § 119(a) on Patent Application No. 2021-211444 filed in Japan on Dec. 24, 2021, the entire content of which is hereby incorporated by reference.

BACKGROUND

The present invention relates to a liquid crystal display device.

Liquid crystal display devices that do not generate noise during vibration are desired, especially when such devices are installed in a vehicle. Each component of a liquid crystal display device can have a dimensional error, depending on the manufacturing process, and in order to properly assemble components with dimensional errors, it is necessary to have appropriate clearance between respective components.

However, because of the clearance between the respective components, those components touch each other when the liquid crystal display device vibrates, which generates noise. To prevent this noise, some liquid crystal display devices have a tape attached from outside to suppress vibration. This noise prevention tape, however, can lower the assembly efficiency and repairability of the liquid crystal display device.

SUMMARY

An aspect of the present disclosure is a liquid crystal display device, including: a front bezel; a backlight unit; and a liquid crystal panel between the front bezel and the backlight unit. The front bezel includes a periphery portion that surrounds a display area of the liquid crystal panel on a front side of the liquid crystal panel, and a side wall that stands from the periphery portion toward a rear side. The backlight unit includes a case having a bottom plate and a side wall that stands from the bottom plate, an optical component placed inside the case, and an elastic component that engages with the side wall of the case, making contact with the optical component. The side wall of the front bezel is located outside the side wall of the case. The elastic component includes an outer portion. The outer portion is positioned between an inner surface of the side wall of the front bezel and an outer surface of the side wall of the case, makes contact with the inner surface of the side wall of the front bezel and the outer surface of the side wall of the case, and presses the inner surface of the side wall of the front bezel and the outer surface of the side wall of the case along an in-plane direction of the display area.

It is to be understood that both the foregoing general description and the following detailed description are exemplary and explanatory and are not restrictive of this disclosure.

DETAILED DESCRIPTION OF EMBODIMENTS

Hereinafter, embodiments of this disclosure will be described with reference to the accompanying drawings. It should be noted that the embodiments are merely examples to implement this disclosure and are not to limit the technical scope of this disclosure. Elements common to the drawings are denoted by the same reference signs.

Because of a dimensional error in components of a liquid crystal display device, the respective components are designed to have a clearance therebetween. Due to this clearance, those components touch each other when the liquid crystal display device vibrates during operation, which possibly generates noise. For example, noise generated by the front bezel and the case of the backlight unit can cause a serious problem.

In one embodiment of the present specification, an elastic component is placed between the backlight unit and the front bezel. A portion of the elastic component is directly sandwiched by a side wall of a case of the backlight unit and a side wall of the front bezel. This makes it possible to suppress noise that can be generated between the backlight unit and the front bezel.

<Device Configuration>

Figure 1:
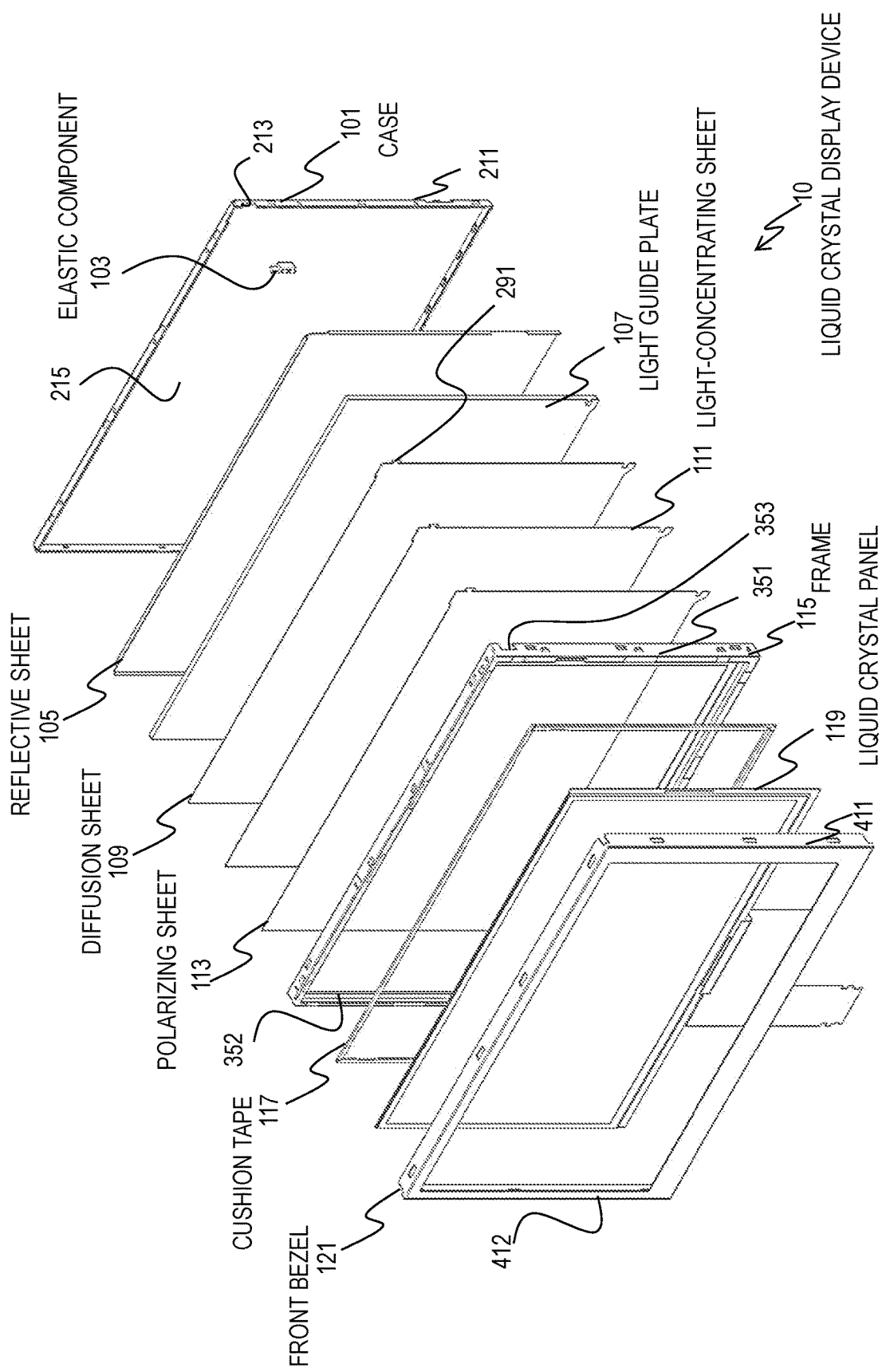
FIG. 1 is an exploded perspective view schematically illustrating an overall configuration example of a liquid crystal display device of one embodiment of the present specification.

FIG. 1 is an exploded perspective view schematically illustrating an overall configuration example of a liquid crystal display device 10 of one embodiment of the present specification. In the descriptions below, a side of the liquid crystal display device 10 facing a user who sees a displayed image will be referred to as a front side, and the side opposite of the front side will be referred to as a rear side, back side, or rear surface.

The liquid crystal display device 10 illustrated in FIG. 1 incudes a case 101, a reflective sheet 105, a light guide plate 107, a diffusion sheet 109, a light-concentrating sheet 111, a polarizing sheet 113, a frame 115, a cushion tape 117, a liquid crystal panel 119, and a front bezel 121 arranged in this order from the back side. The polarizing sheet 113 may be replaced by a set of diffusion sheet and light-concentrating sheet. The liquid crystal display device 10 also includes an elastic component 103. The elastic component 103 is one of the features of embodiments of the present specification, and includes an outer portion that is directly sandwiched by the case 101 and the front bezel 121. The elastic component 103 also makes contact with the optical components. With this elastic component 103, it is possible to suppress noise caused by movements of the respective components in the liquid crystal display device 10.

The backlight unit is constituted of the reflective sheet 105, the light guide plate 107, the diffusion sheet 109, the light-concentrating sheet 111, the polarizing sheet 113, the frame 115, and the elastic component 103. The front bezel 121 and the frame 115 have a frame-like shape, and have an opening larger than the display area of the liquid crystal panel 119 in the middle.

The reflective sheet 105, the light guide plate 107, the diffusion sheet 109, the light-concentrating sheet 111, and the polarizing sheet 113 are each an example of the optical component included in the backlight unit. Those parts are contained in the case 101. The case 101 is in a shallow-box shape, and has a bottom 215 and side walls 211 that stand from the bottom toward the front side. In the configuration example of FIG. 1, the case 101 includes a rectangular bottom 215 that is the primary surface having the largest area, and four side walls 211 that stand from the edge of the bottom 215 toward the front side. In FIG. 1, one side wall is denoted with the reference character 211 as an example. The one side wall 211 has a recess 213 formed therein where the elastic component 103 is placed as described below.

The outer shape of the optical components is substantially rectangular. More specifically, the light guide plate 107 has front and back primary surfaces and four side faces. The diffusion sheet 109, the light-concentrating sheet 111, and the polarizing sheet 113 each has a tab that protrudes from an edge thereof. In FIG. 1, the tab of the diffusion sheet 109 is denoted with the reference character 291 as an example. As described below, the tab 291 engages with a groove of the elastic component 103 to keep the diffusion sheet 109 from moving during vibration.

The backlight unit may include a light source not shown in FIG. 1, such as one or a plurality of LEDs, for example. The light guide plate 107 is thicker than other optical components. The optical components included in the backlight unit vary depending on the design, and FIG. 1 merely illustrates examples of the optical components. Some of the optical components in FIG. 1 may be omitted, or other optical components not shown in the figure may be added.

The frame 115 includes an inner frame part 352 having a rectangular loop shape, and four side walls 351 that stand from the edge of the inner frame part 352 toward the rear side. In FIG. 1, one of the side walls is denoted with the reference character 351 as an example. The inner frame part 352 is a base where the liquid crystal panel 119 is placed and secured. Part of the side wall 351 of the frame 115 engages with part of the side wall of the case 101. The side wall 351 has a recess (opening) 353, and part of the elastic component 103 described below passes through the recess 353.

The liquid crystal panel 119 is affixed to the front surface of the frame 115 using the cushion tape 117. The front periphery of the liquid crystal panel 119 is covered by the front periphery 412 of the front bezel 121. The front periphery 412 is in a rectangular frame shape. In FIG. 1, a strip that extends downwardly from the end of the liquid crystal panel 119 is a flexible substrate that connects circuits on the substrate to an external control circuit.

Part of the side wall 411 of the front bezel 121 engages with part of the side wall of the backlight unit such as part of the side wall of the frame 115. The front bezel 121 includes four side walls 411 that stand from the four sides of the front periphery 412 toward the rear side, for example. In FIG. 1, one of the side walls is denoted with the reference character 411 as an example. The liquid crystal panel 119 is placed between the front bezel 121 and the frame 115. A viewer sees an image displayed in the liquid crystal panel 119 through the opening of the front bezel 121.

As described below, a portion of the elastic component 103 is sandwiched by the side wall 411 of the front bezel 121 and the side wall 211 of the case 101. The elastic component 103 is in contact with those two side walls, and presses them in the opposite directions along the plane of the display surface (primary surface) of the liquid crystal panel 119. The direction along the plane is perpendicular to the direction along which the components of the liquid crystal display device 10 are layered. With the elastic component 103, the case 101 and the front bezel 121 are kept from moving due to the clearance therebetween and vibration, it is possible to suppress the generation of noise. Also, because the liquid crystal panel 119 does not receive any pressing force in the layering direction, the display quality does not degrade.

As described below, the elastic component 103 supports the rear surface of the frame 115. Thus, it is possible to suppress noise caused by the movement of the frame 115. The frame 115 may be omitted. The liquid crystal panel 119 may be affixed to a rear side of a cover panel, which is not shown in the figure, using optical elastic resin.

In the configuration example of FIG. 1, the substrate and display area of the liquid crystal panel 119 has a rectangular shape, and the front bezel 121 covering the front periphery of the liquid crystal panel 119, the frame 115 that supports the liquid crystal panel 119 through the cushion tape 117, and the case 101 of the backlight unit are all in a rectangular shape in a front view. Those components may be in a different shape. The number of the side walls of the front bezel 121, the frame 15, and the case 101 is not limited to four.

Figure 2:
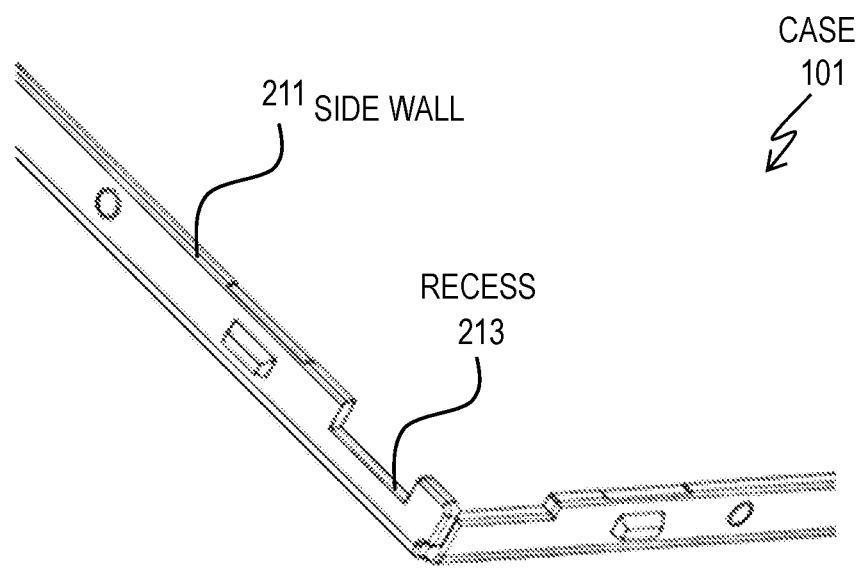
FIG. 2 is a perspective view illustrating a part of the case of the backlight unit.

FIG. 2 is a perspective view illustrating a part of the case 101 of the backlight unit. The side wall 211 of the case 101 has a recess (opening) 213. In one embodiment of the present specification, the elastic component 103 may be placed in this recess 213, and support the side wall 211 with the elastic force thereof. This makes it possible to keep the backlight unit from getting thicker. The elastic component 103 may be bonded together with the side wall 211, but in this embodiment, the elastic component 103 is elastically affixed to the side wall 211, and can be detached. The elastic component 103 may be attached to the side wall 211 instead of using the recess in the side wall 211.

Figure 3:
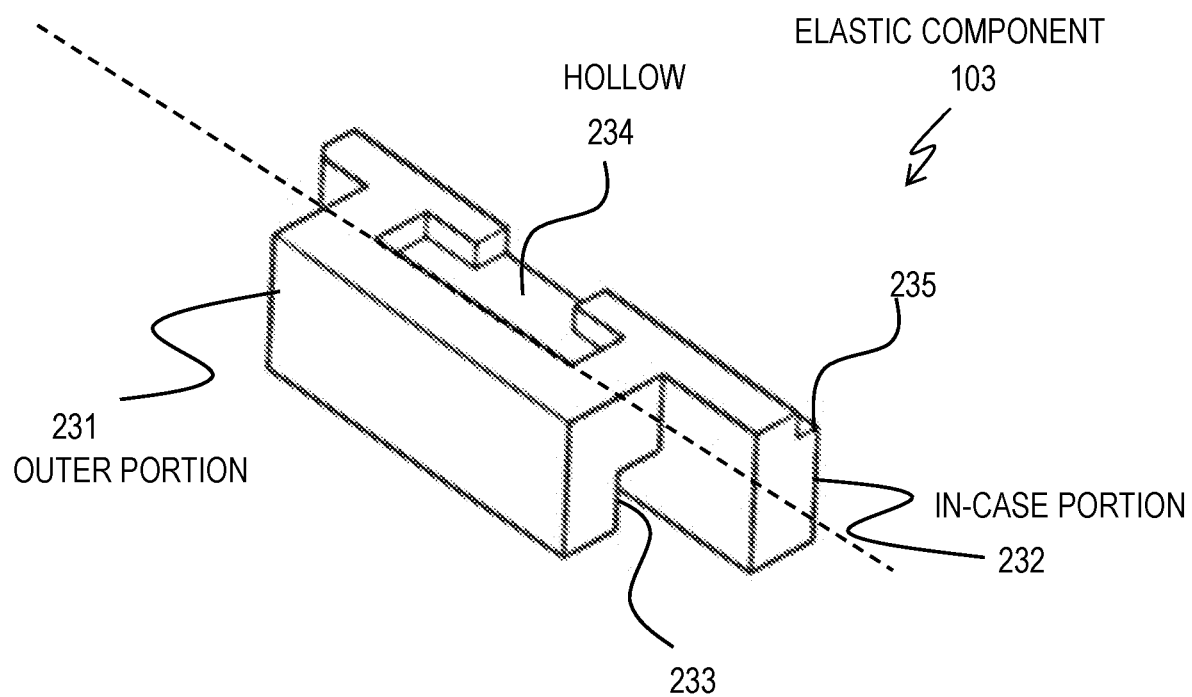
FIG. 3 is a perspective view illustrating a configuration example of the elastic component.

FIG. 3 is a perspective view illustrating a configuration example of the elastic component 103. In one embodiment of the present specification, the elastic component 103 engages with the side wall 211 of the case 101 of the backlight unit, making contact with the side wall of the case 101 and the front bezel 121 as well as the optical components in the case 101 to restrict the movement of those component.

The elastic component 103 is constituted of an outer portion 231 and an inner portion on the inner side of the outer portion 231. In FIG. 3, the boundary of the outer portion 231 is indicated with the broken line. The inner portion includes an in-case portion 232 that is located inside of the inner surface of the side wall 211 of the case 101, and a center portion on the top surface of the side wall between the outer portion 231 and the in-case portion 232.

On the rear side of the elastic component 103 between the outer portion 231 and the in-case portion 232, a groove (recess) 233 is formed. As described below, part of the side wall 211 of the case 101 is inserted into the groove 233. The elastic component 103 makes contact with the side wall 211 at the inner surface of the groove 233. In one embodiment of the present specification, a distance between the outer portion 231 and the in-case portion 232 is smaller than the thickness of the side wall 211, and the elastic component 103 secures the side wall 211 only with the elastic force thereof.

On the front side of the elastic component 103, a hollow (recess) 234 is formed. The hollow 234 has an opening toward the inside of the case, i.e., there is no wall between the hollow and the inside of the case. As described below, the tabs of the optical sheets 109, 111, and 113 are placed in the hollow 234. By part of the inner surface of the hollow 234 engaging with part of those tabs, the elastic component 103 restricts movements of the optical sheets 109, 111, and 113. A step 235 is formed in the in-case portion 232. On this step, the optical sheets 109, 111, and 113 are partially placed.

Figure 4:
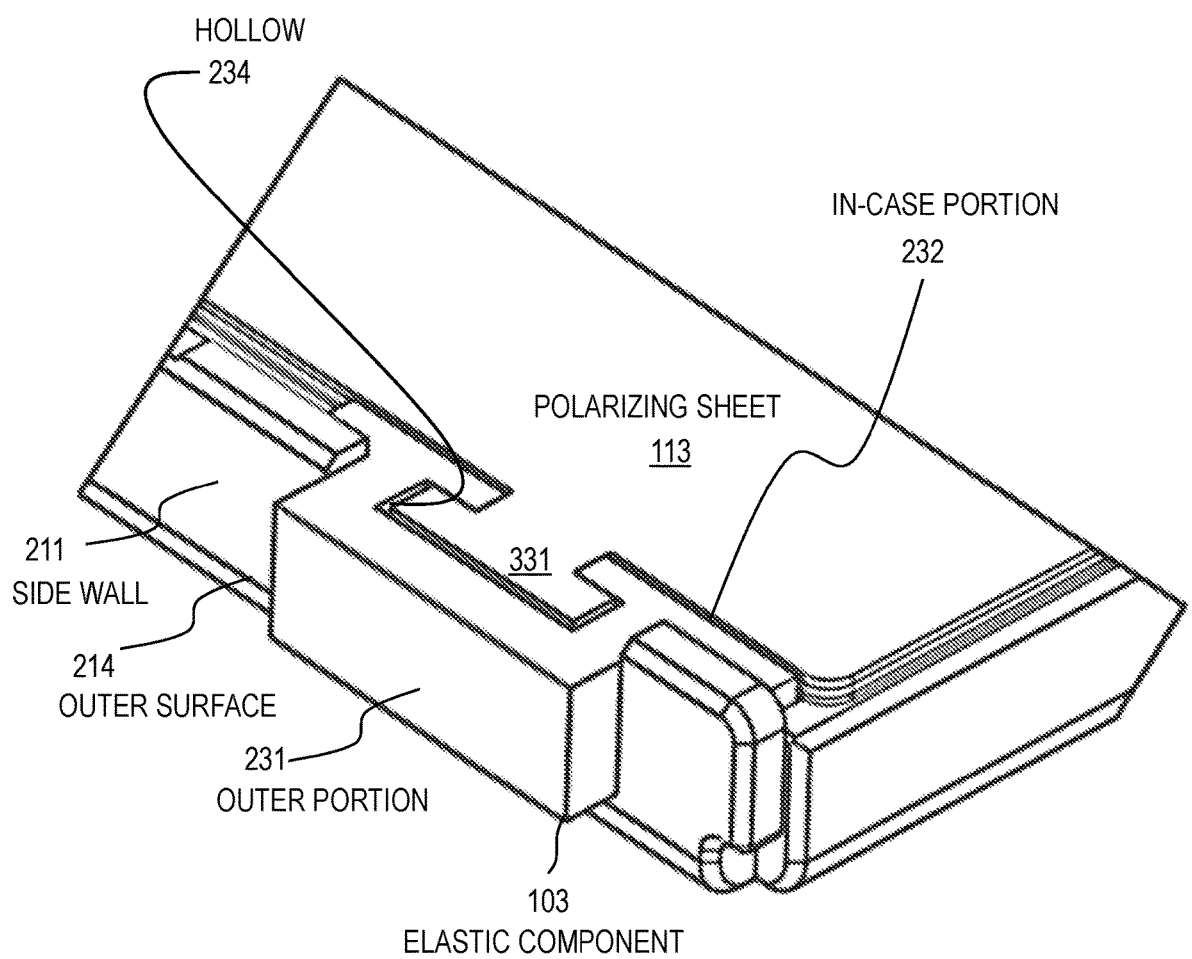
FIG. 4 is a perspective view illustrating the elastic component attached to the side wall of the case.

FIG. 4 is a perspective view illustrating the elastic component 103 attached to the side wall 211 of the case 101. The elastic component 103 engages with the side wall 211 of the case 101. Part of the side wall 211 of the case 101 is sandwiched by the outer portion 231 and the in-case portion 232 of the elastic component 103. The outer portion 231 protrudes outwardly beyond the outer surface 214 of the side wall 211. In FIG. 4, the outer surface 214 has a normal line perpendicular to the direction in which the side wall 211 stands up and the direction in which the side wall 211 extends.

The tabs of the optical sheets 109, 111, and 113 that protrude from the main body of each sheet are placed in the hollow 234 of the elastic component 103. In FIG. 4, the polarizing sheet 113 and the tab thereof are denoted with the reference character 113 and 331. Part of the tab makes contact with the side wall of the hollow 234. This restricts movements of the optical sheets 109, 111, and 113 due to vibration, which makes it possible to prevent noise generation.

Figure 5:
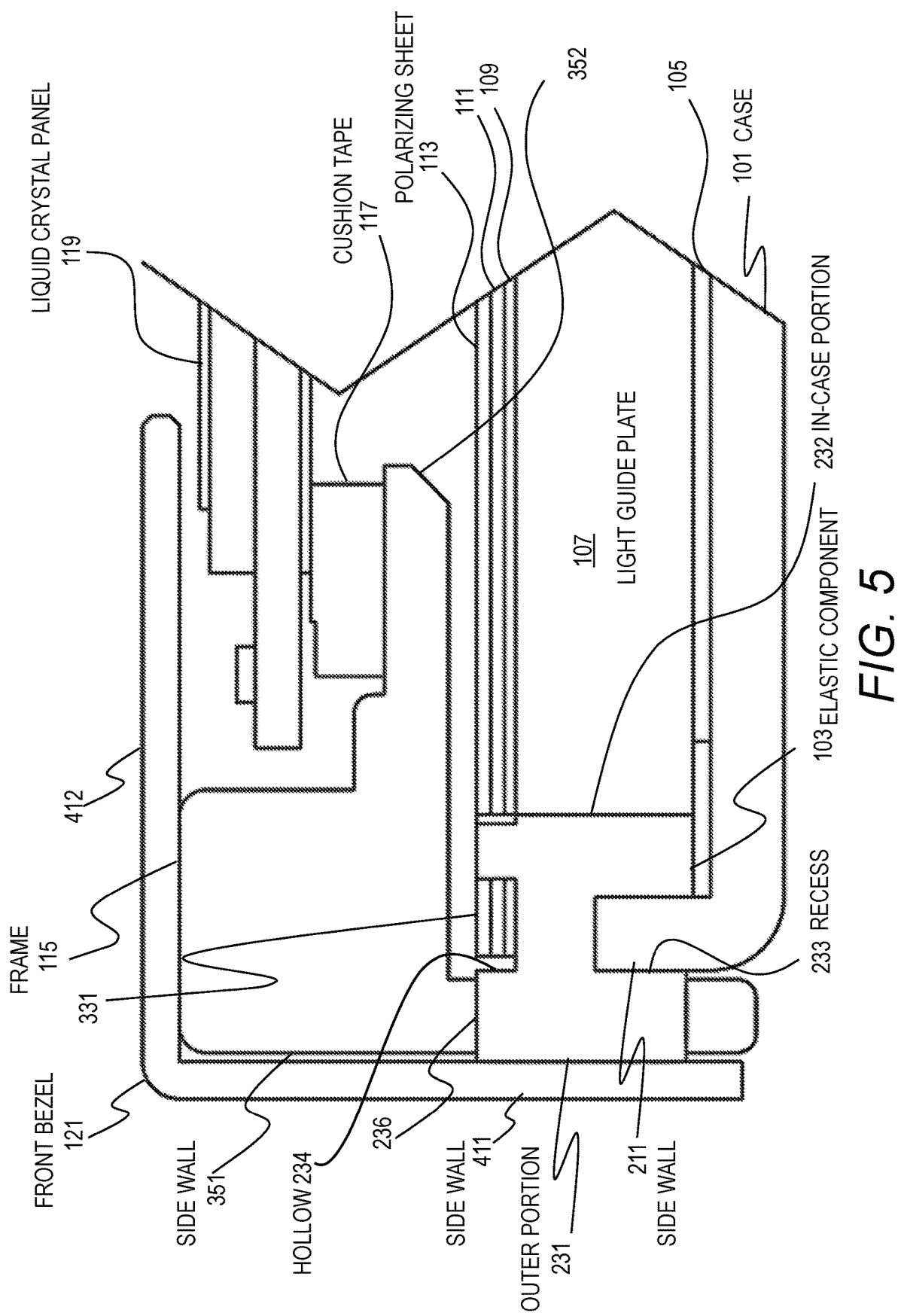
FIG. 5 is a cross-sectional view of a part of the liquid crystal display device including the elastic component.

FIG. 5 is a cross-sectional view of a part of the liquid crystal display device 10 including the elastic component 103. The elastic component 103 may be formed of silicon rubber, for example, and the elasticity thereof is smaller than those of the case 101, front bezel 121, frame 115 and light guide plate 107. The case 101 and the front bezel 121 may be made of a metal such as stainless steel, for example. The frame 115 and the light guide plate 107 may be formed of a resin, for example. The case 101 and the front bezel 121 may be made of resin, and the frame 115 may be made of metal.

The liquid crystal panel 119 is affixed to the inner periphery 352 of the frame 115 using the cushion tape 117. In the liquid crystal panel 119, a TFT (thin film transistor) substrate and a color filter (CF) substrate are layered in this order from rear side. The TFT substrate and the CF substrate are bonded together with each other by a not-shown sealant (adhesive), and a liquid crystal material is sealed therein.

In this embodiment, the TFT substrate and the CF substrate are in a rectangular shape. Those components may be in a different shape. The TFT substrate includes: a substrate; a TFT array circuit formed on the front primary surface of an insulating substrate; and a polarizing plate fixed to the rear primary surface of the insulating substrate. The CF substrate includes: color filters of multiple colors formed on the rear primary surface of an insulating substrate; and a polarizing plate fixed to the front primary surface of the insulating substrate.

The liquid crystal panel 119 is affixed to the backlight unit only by the cushion tape 117. The two substrates of the liquid crystal panel 119 are not in contact with the front bezel, and also not in contact with the optical components in the backlight unit or the case 101. Thus, the two substrates of the liquid crystal panel are not pressed by any part in the layering direction, and therefore, the display quality thereof does not degrade due to distortion.

The elastic component 103 engages with the side wall 211 of the case 101. Part of the side wall 211 of the case 101 is inserted into the recess of the elastic component 103, and sandwiched by the outer portion 231 and the in-case portion 232 of the elastic component 103. The side wall 211 is in contact with the inner surface of the outer portion 231 and the outer surface of the in-case portion 232.

The outer portion 231 of the elastic component 103 is positioned between the side wall 211 of the case 101 and the side wall 411 of the front bezel 121, being sandwiched by them. The outer portion 231 is in contact with the outer surface of the side wall 211 of the case 101 and the inner surface of the side wall 411 of the front bezel 121. In FIG. 5, the outer surface is the surface on the left side of the side wall 211, and the inner surface is the surface on the right side of the side wall 411, which face each other in the in-plane direction of the liquid crystal panel.

The outer portion 231 presses the side wall 211 of the case 101 and the side wall 411 of the front bezel 121 by the elastic force thereof in opposite directions along the plane of the liquid crystal panel. Specifically, the outer portion 231 presses the side wall 411 of the front bezel 121 toward the outside along the in-plane direction, and presses the side wall 211 of the case 101 toward the inside along the in-plane direction.

By the elastic component 103 protruding beyond the case 101 and making contact with the front bezel 121, the clearance between the case 101 and the front bezel 121 is eliminated, which makes it possible to reduce noise caused by the case 101 and the front bezel 121 touching each other. Also, friction between the elastic component 103 and the front bezel 121 keeps the front bezel 121 from moving in the component layering direction (normal direction of the liquid crystal panel) and making noise.

In one embodiment of the present specification, the front surface (top surface in FIG. 5) 236 of the outer portion 231 of the elastic component 103 makes contact with the rear surface of the frame side wall 351, allowing the elastic component 103 to support and press the frame 115 in the layering direction. As described with reference to FIG. 1, the frame side wall 351 has the recess 353 formed therein, and the front surface 236 is in contact with the inner surface of the recess 353. The outer portion 231 is in contact with the front bezel side wall 411 through the recess (opening) 353. Part of the frame 115 engages with part of the case 101, and movements of the frame 115 is restricted by the elastic component 103. In the configuration example of FIG. 5, the front surface of the side wall 351 of the frame is in contact with the rear surface of the front bezel 121.

The in-case portion 232 of the elastic component 103 is in contact with a side surface of the light guide plate 107. The side surface of the light guide plate 107 is a surface other than the primary surfaces, which are the front and rear surfaces. The side surface of the light guide plate 107 faces the inner surface of the side wall 211 of the case 101. The in-case portion 232 presses the light guide plate 107 against the inner surface of the side wall 211 of the case 101 in the in-plane direction of the liquid crystal panel. This restricts movements of the light guide plate 107 due to vibration, which makes it possible to prevent noise generation.

The main bodies of the optical sheets 109, 111, and 113 are placed on the light guide plate 107. The tabs of the optical sheets 109, 111, and 113 that protrude from the main body of each sheet are placed in the hollow 234 of the elastic component 103. In FIG. 5, the tab of the polarizing sheet 113 is denoted with the reference character 331. The tab of each optical sheet is secured in a certain position by being in contact with at least part of the inner surfaces of the hollow 234. This restricts movements of the optical sheets 109, 111, and 113 due to vibration, which makes it possible to prevent noise generation.

Figure 6:
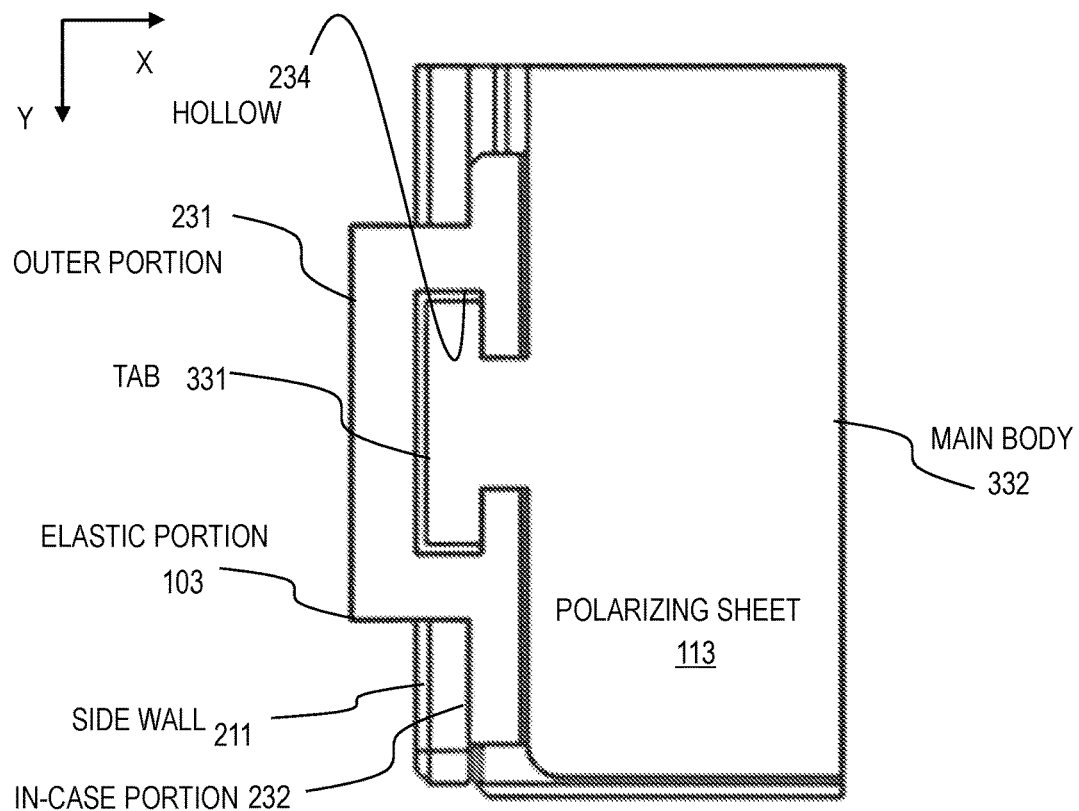
FIG. 6 is a top view schematically illustrating an engagement relationship between the elastic component and the polarization sheet.

FIG. 6 is a top view schematically illustrating an engagement relationship between the elastic component 103 and the polarization sheet 113. This description applies to other optical sheets 109 and 111. In FIG. 6, the X direction is the left-to-right direction, and perpendicular to the Y direction along which the case side wall 211 (wall surface) extends.

The polarizing sheet 113 includes a main body 332 and the tab 331 that protrudes from an edge of the main body 332. The main body 332 includes the center of gravity of the polarizing sheet 113, has a greater surface area and substantially rectangular shape. The main body 332 is contained inside the case 101. The tab 331 is placed inside the hollow 234 on the front surface of the elastic component 103.

Figure 7:
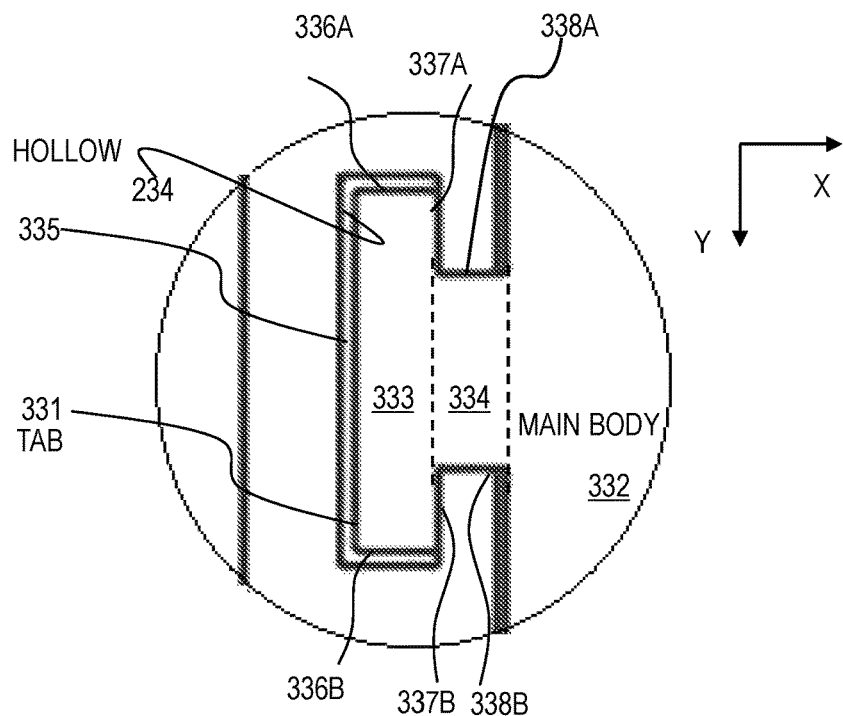
FIG. 7 is an enlarged top view of the tab placed in the hollow.

FIG. 7 is an enlarged top view of the tab 331 placed in the hollow 234. The tab 331 includes a wider outer portion 333 and a narrower inner potion 334. The portion 334 is a connecting part between the portion 333 and the main body 332.

The outline of the tab 331 is defined by sides 335, 336A, 336B, 337A, 337B, 338A, and 338B. The sides 335, 336A, 336B, 337A, and 337B are the sides of the portion 333, and the sides 338A and 338B are the sides of the portion 334. The side 338A and the side 338B are opposite to each other.

The side 335 is between the side 336A and the side 336B, and connected thereto. The side 335 extends in the Y direction, and the sides 336A and 336B extend in the X direction. The side 336A and the side 336B are opposite to each other. The side 335 is the outermost side from the main body 332. The sides 337A and 337B extend in the Y direction, and are located between the side 335 and the main body 332. The sides 337A and 337B respectively connect to the sides 336A and 336B. The sides 337A and 337B are opposite to the side 335.

There is a clearance between the sides 335, 336A, 336B of the portion 333 and the inner walls of the hollow 234. This makes it possible to suppress distortion of the diffusion sheet due to heat expansion. The sides 337A and 337B and the sides 338A and 338B are in contact with the inner walls of the hollow 234. This keeps the polarizing sheet 113 in an appropriate position.

Figure 8:
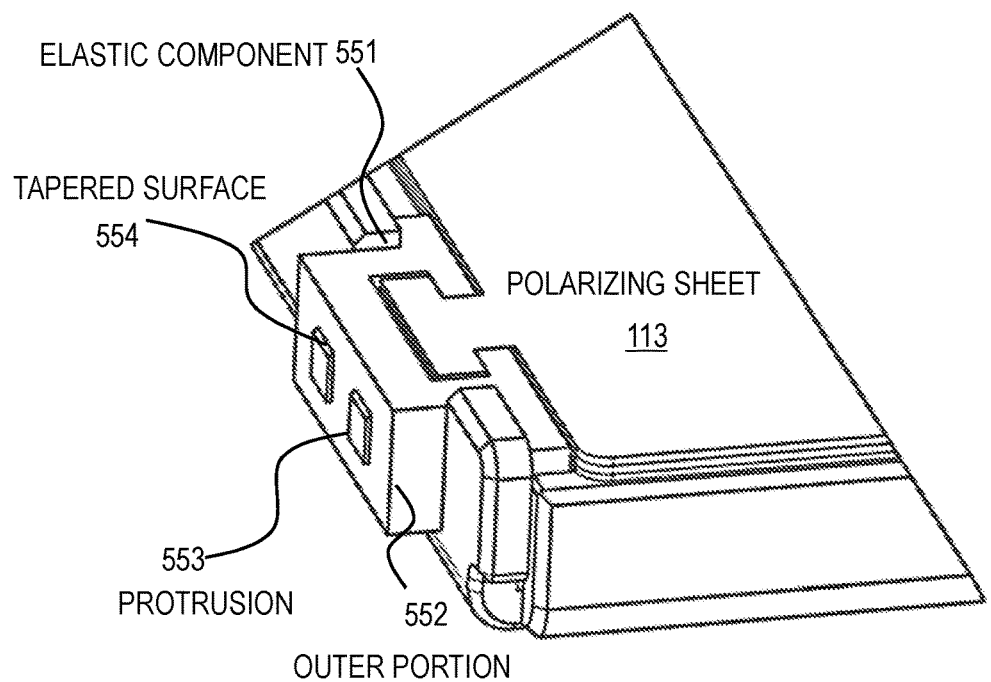
FIG. 8 illustrates another configuration example of the elastic component.

FIG. 8 illustrates another configuration example of the elastic component. An elastic component 551 includes protrusions 553 on a side facing the front bezel side wall. The protrusions 553 are formed by the outer surface of an outer potion 552. The elastic component 551 is made of the same material, for example. This applies to other examples of the elastic component. The configuration example of FIG. 8 includes two protrusions 553 arranged in the direction perpendicular to the normal direction of the display area.

The protrusions 553 each have a substantial cube shape, having a plurality of flat surfaces, and the front surface is a tapered surface. The protrusions 553 can engage with the front bezel 121 with ease in the assembly process of the liquid crystal display device 10. Furthermore, the tapered front surface 554 makes it even easier to engage with the front bezel 121. The shape, number, and position of the protrusions may be appropriately designed, and the present invention is not limited to this example.

In the assembly process of the liquid crystal display device 10, for example, the reflective sheet 105 and the light guide plate 107 are placed in the case 101, and then the elastic component 103 is placed in the recess 213 of the case side wall 211. Thereafter, the optical sheets 109, 111, and 113 are placed, and the frame 115 and the case 101 are put together. The cushion tape 117 is pasted on the inner periphery 352 of the frame 115, and the liquid crystal panel 119 is bonded thereto.

Next, the front bezel 121 is placed to cover the periphery of the liquid crystal panel 119, and attached to the frame 115. The front bezel 121 is placed such that the inner surface of the front bezel side wall 411 makes contact with the protrusions 553. The protrusions 553 make the contact area of the front bezel side wall 411 and the elastic component 551 smaller, which makes it easier to install the front bezel 121.

Figure 9:
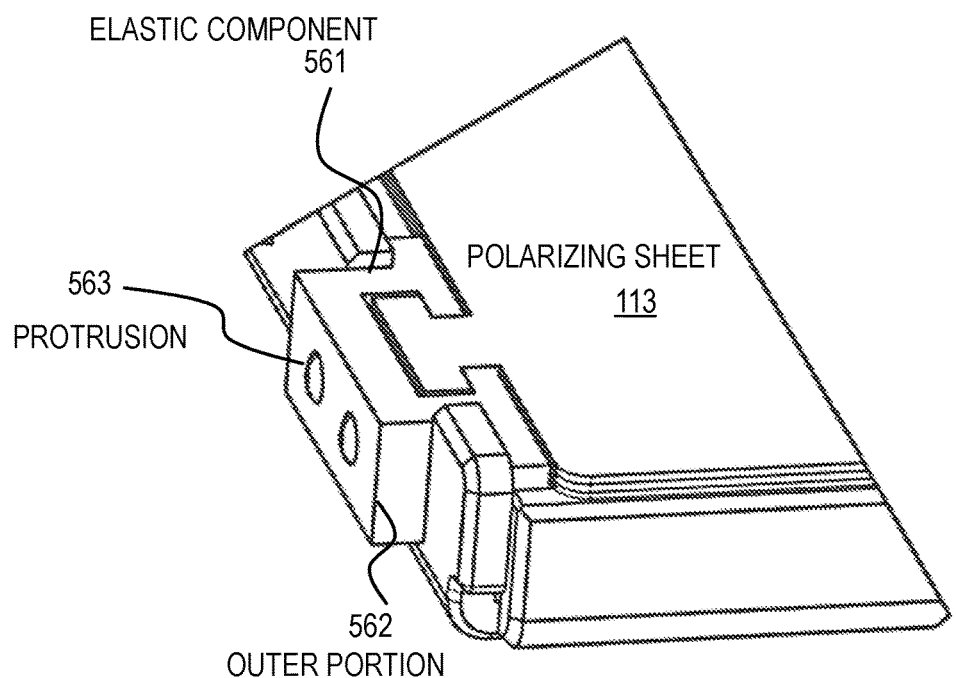
FIG. 9 illustrates another configuration example of the elastic component.

FIG. 9 illustrates another configuration example of the elastic component. An elastic component 561 includes protrusions 563 on a side facing the front bezel side wall. The protrusions 563 are formed by the outer surface of an outer portion 562. The configuration example of FIG. 9 includes two protrusions 563 arranged in the direction perpendicular to the normal direction of the display area. The protrusions 563 have a partially spherical shape, and makes contact with the front bezel 121 at a curved surface. The protrusions 563 can engage with the front bezel 121 with ease in the assembly process of the liquid crystal display device 10.

Figure 10:
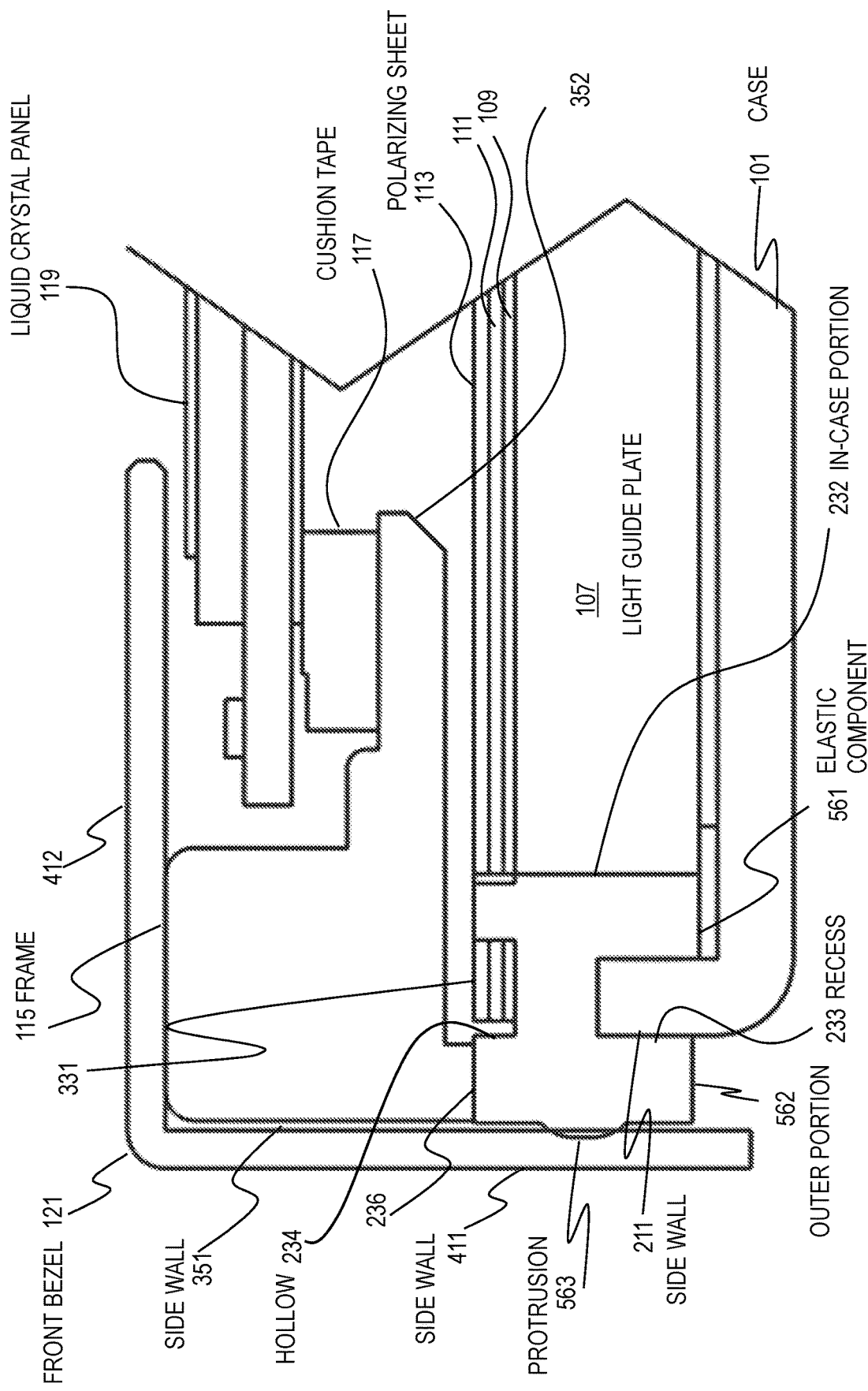
FIG. 10 is a cross-sectional view of a part of the liquid crystal display device in which the elastic component of FIG. 9 is used.

FIG. 10 is a cross-sectional view of a part of the liquid crystal display device in which the elastic component 561 of FIG. 9 is used. Differences from the configuration example of FIG. 5 will mainly be discussed below. As described above with reference to FIG. 9, the protrusion 563 is formed on the side of the outer potion 562 of the elastic component 561 that faces the front bezel side wall 411.

The protrusion 563 is in contact with the inner surface of the front bezel side wall 411, and is deformed as a result of being pressed. The elastic force of the elastic component 561 makes the protrusion 563 press the front bezel side walls 411 and the case side wall 211, respectively.

Figure 11:
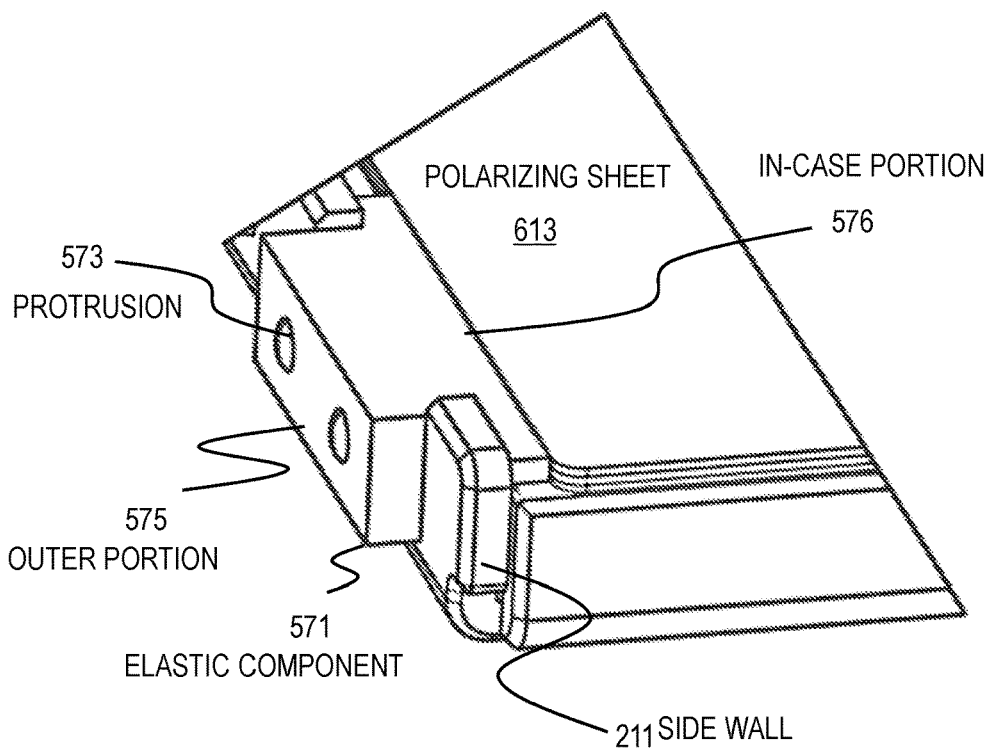
FIG. 11 is a perspective view illustrating an elastic component attached to the side wall of the case.
Figure 12:
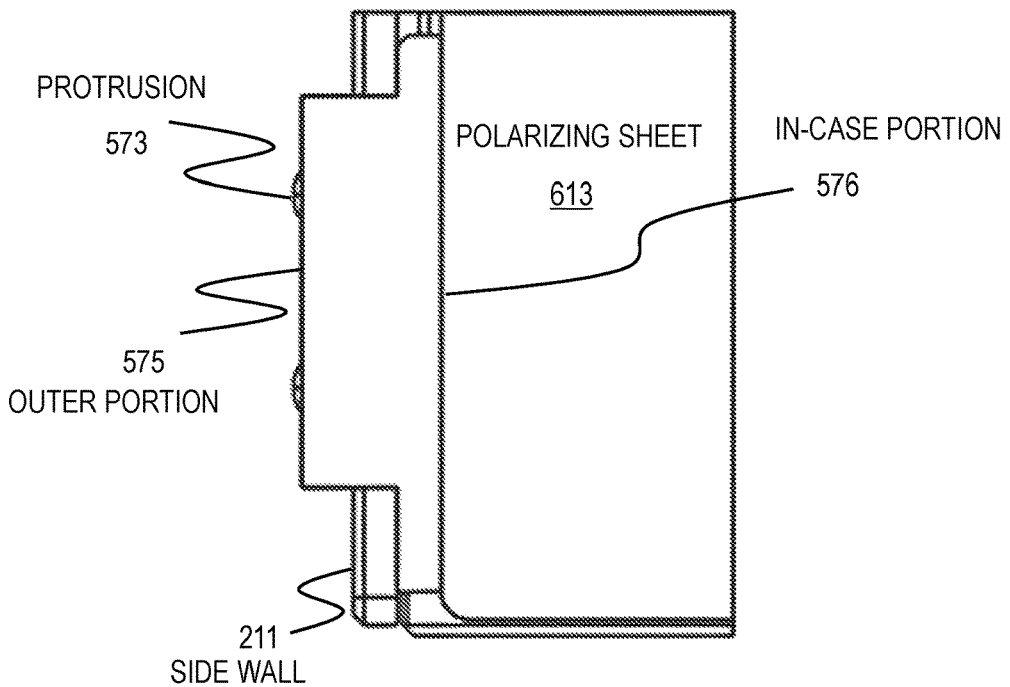
FIG. 12 is a top view seen from the front side of the elastic component.

FIGS. 11 and 12 illustrate another configuration example of the elastic component. FIG. 11 is a perspective view illustrating an elastic component 571 attached to the side wall of the case 101, and FIG. 12 is a top view seen from the front side. Differences from the elastic component 561 of FIGS. 9 and 10 will mainly be discussed below.

The elastic component 571 includes an outer portion 575 and an in-case portion 576. In a manner similar to the elastic component 561, protrusions 573 are formed on the outer surface of the outer portion 575. The front surface of the elastic component 571 is flat, and no recess is formed therein. Thus, the optical sheets including a polarizing sheet 613 do not have a tab that engages with the recess.

The edge of the polarizing sheet 613 is in contact with the inner surface of the in-case portion 576 of the elastic component. Although not shown in FIG. 11 or 12, the inner surface of the in-case portion 576 is in contact with the light guide plate 107 as in other examples. This restricts movements of the optical sheets. In FIGS. 11 and 12, the polarizing sheet among the optical sheets is denoted with the reference character 613 as an example. This description of the polarizing sheet 613 is applicable to other optical sheets.

Figure 13:
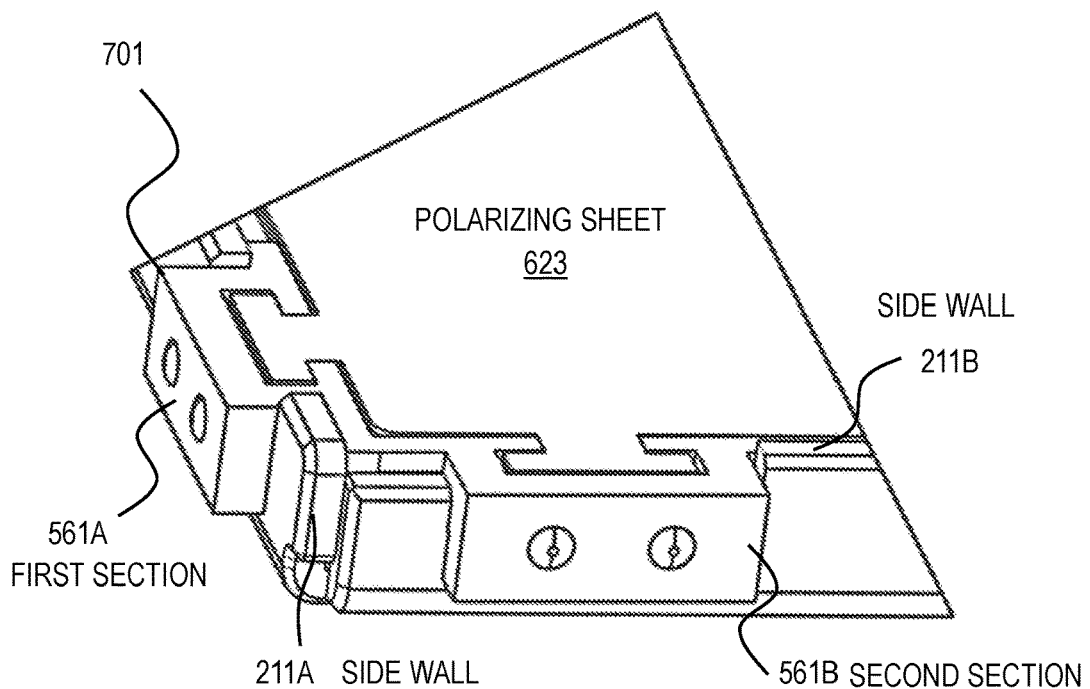
FIG. 13 is a perspective view illustrating an elastic component attached to the side walls of the case.
Figure 14:
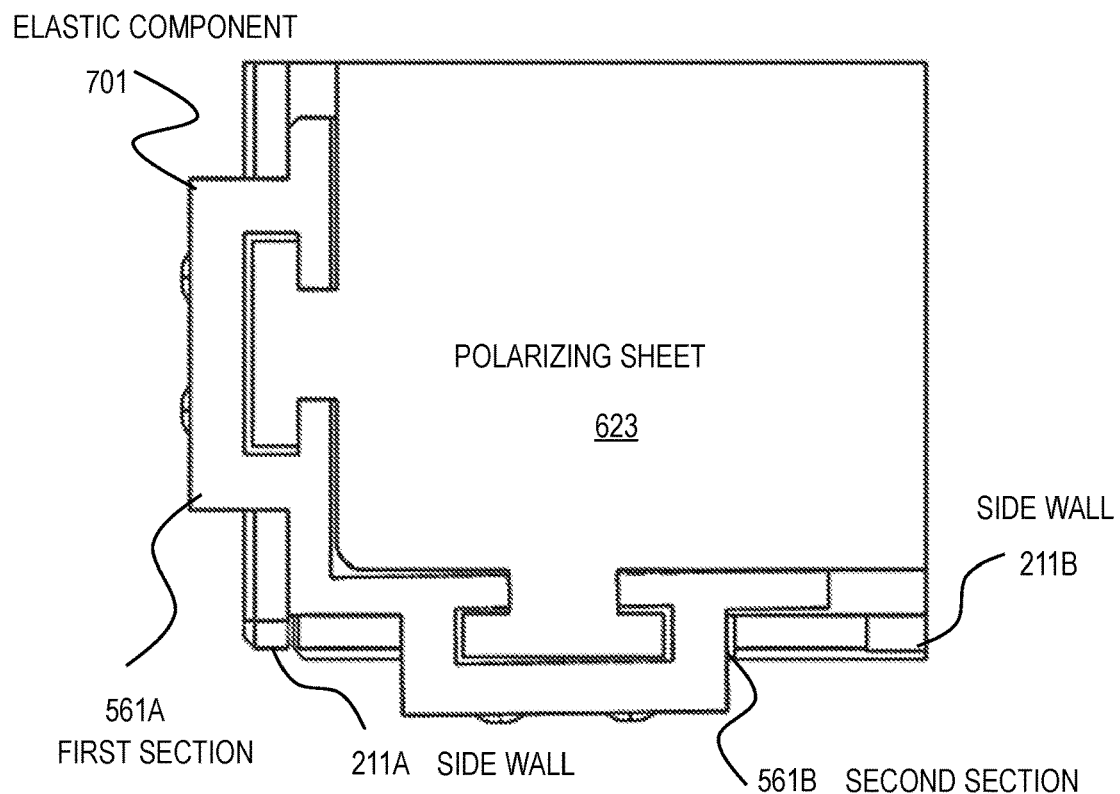
FIG. 14 is a top view from the front side of the elastic component.

FIGS. 13 and 14 illustrates another configuration example of the elastic component. FIG. 13 is a perspective view illustrating an elastic component 701 attached to the side walls of the case 101, and FIG. 14 is a top view from the front side.

Differences from the elastic component 561 of FIGS. 9 and 10 will mainly be discussed below.

The elastic component 701 includes a first section 561A and a second section 561B. In this configuration example, the first section 561A and the second section 561B are integrated. The first section 561A and the second section 561B are made of the same material, for example. The sections 561A and 561B engage with the case side walls 211A and 211B, respectively.

The side walls 211A and 211B are adjacent to each other, and constitute a corner of the case 101. In the example of FIGS. 13 and 14, the side walls 211A and 211B extend in the directions perpendicular to each other along the plane. In FIG. 14, the side wall 211A extends in the vertical direction, and the side wall 211B extends in the horizontal direction. Because the sections are attached to the side walls that are not parallel to each other, it is possible to restrict movements of the front bezel and the case more effectively.

The first section 561A and the second section 561B have substantially the same structure as the elastic component 561 described with reference to FIGS. 9 and 10. That is, the first section 561A and the second section 561B each have the outer portion and the in-case portion, a recess formed on the front surface, and protrusions formed on the surface facing the front bezel side wall. A polarizing sheet 623 has two tabs that respectively engage with the two sections 561A and 561B. The description of the tab 331 of the polarizing sheet 113 is applicable to those tabs, and other optical sheets may also have a similar tab.

The first section and the second section may be in a different shape. For example, one may have the shape illustrated in FIGS. 9 and 10, and the other may have the shape illustrated in FIGS. 11 and 12. Those components may have the same shape but different sizes. Those components may be formed of different materials.

Figure 15:
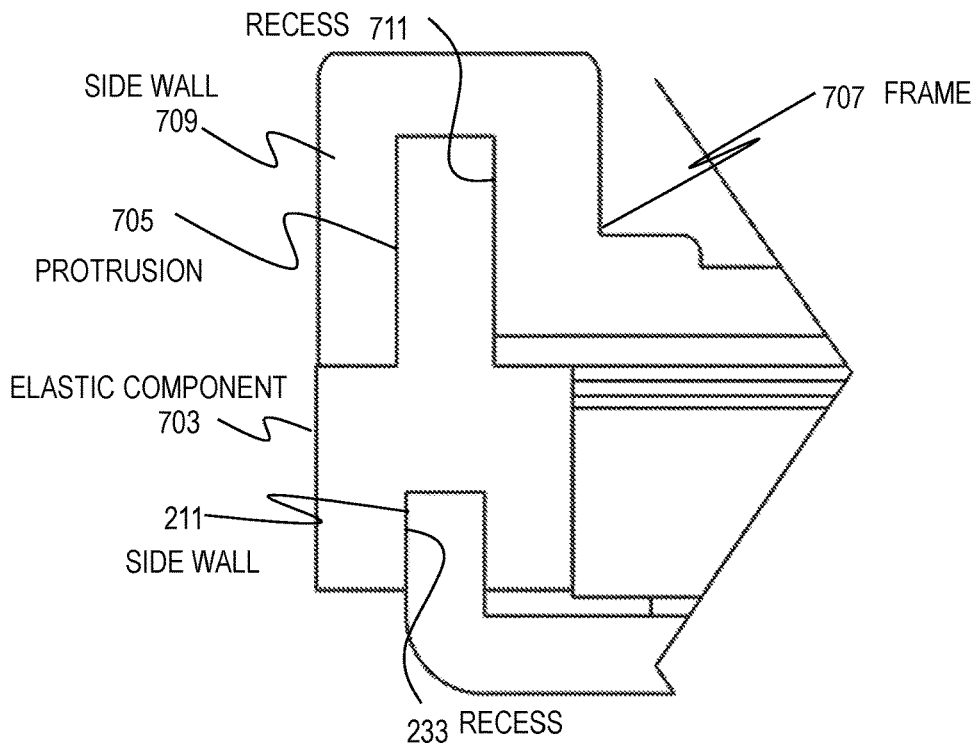
FIG. 15 illustrates another configuration example of the elastic component.

FIG. 15 illustrates another configuration example of the elastic component. FIG. 15 is a cross-sectional view of an example of an elastic component 703 attached to the case side wall 211, and a frame 707 that engages with the elastic component 703. Differences from the configuration example of FIGS. 3 to 5 will mainly be discussed below.

The elastic component 703 includes, on the front surface thereof, a protrusion 705 that protrudes toward the front side. A hollow that engages with the optical sheets is not formed on the front surface of the elastic component 703. The protrusion 705 extends in the extending direction of the side wall 211, or in other words, the front-to-back direction on the paper in FIG. 15. A side wall 709 of the frame has a recess 711 in the rear surface. The recess 711 extends in the front-to-back direction on the paper in FIG. 15.

In the configuration example of FIG. 15, the flat rear surface of the frame side wall 709 and the flat front surface 236 of the elastic component 703 make contact with each other. The rear surface of the frame side wall 709 and the front surface of the elastic component 703 face each other and make contact with each other. The protrusion 705 of the elastic component is inserted into the recess 711 of the frame side wall and fits therein. The frame side wall 709 is supported by the protrusion 705 with the elastic force thereof. This way, since the elastic component 703 engages with the frame 707, movements of the frame 707 can be effectively suppressed.

Figure 16:
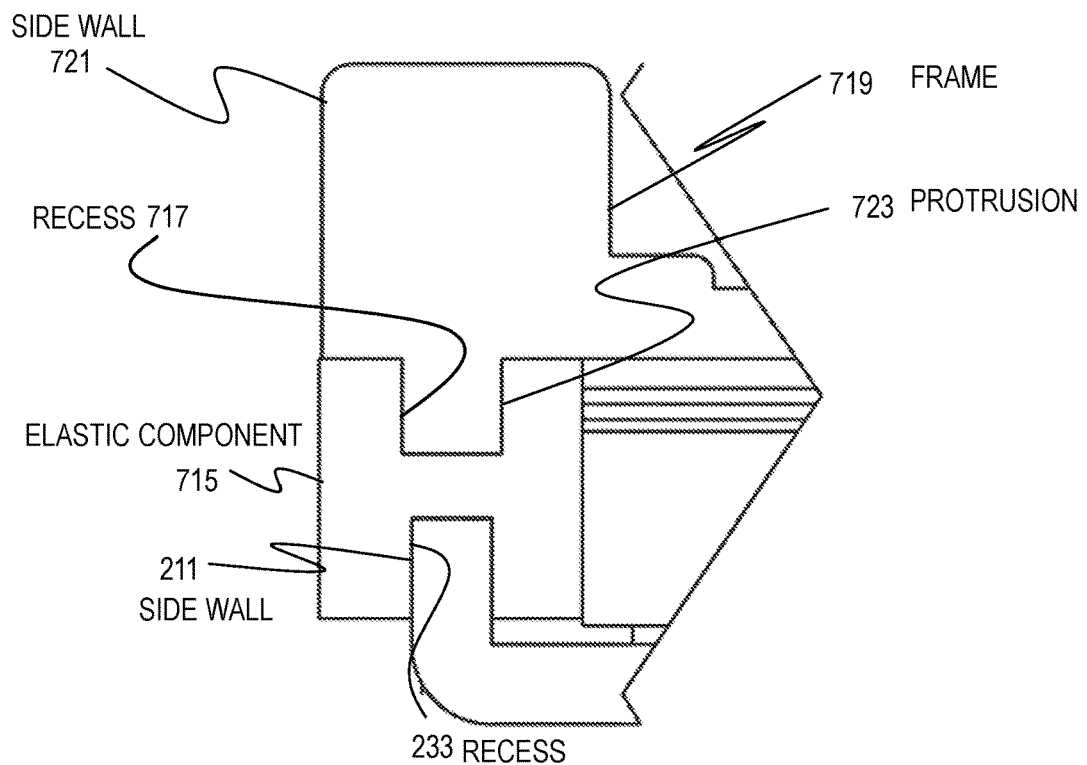
FIG. 16 illustrates another configuration example of the elastic component.

FIG. 16 illustrates another configuration example of the elastic component. FIG. 16 is a cross-sectional view of an example of an elastic component 715 attached to the case side wall 211, and a frame 719 that engages with the elastic component 715. Differences from the configuration example of FIGS. 3 to 5 will mainly be discussed below.

The elastic component 715 includes a recess 717 on the front surface. A recess that engages with the optical sheets is not formed on the front surface of the elastic component 715. The recess 717 extends in the extending direction of the side wall 211, or in other words, the front-to-back direction on the paper in FIG. 16. A side wall 721 of the frame has a protrusion 723 on the rear surface. The rear surface of the frame side wall 721 and the front surface of the elastic component 715 face each other and make contact with each other.

The protrusion 723 of the frame side wall 721 is inserted into the recess 717 of the elastic component and fits therein. The protrusion 723 of the frame side wall 721 is secured within the recess 717 of the elastic component by the elastic force thereof. This way, since the elastic component 715 engages with the frame 719, movements of the frame 719 can effectively be suppressed.

Figure 17:
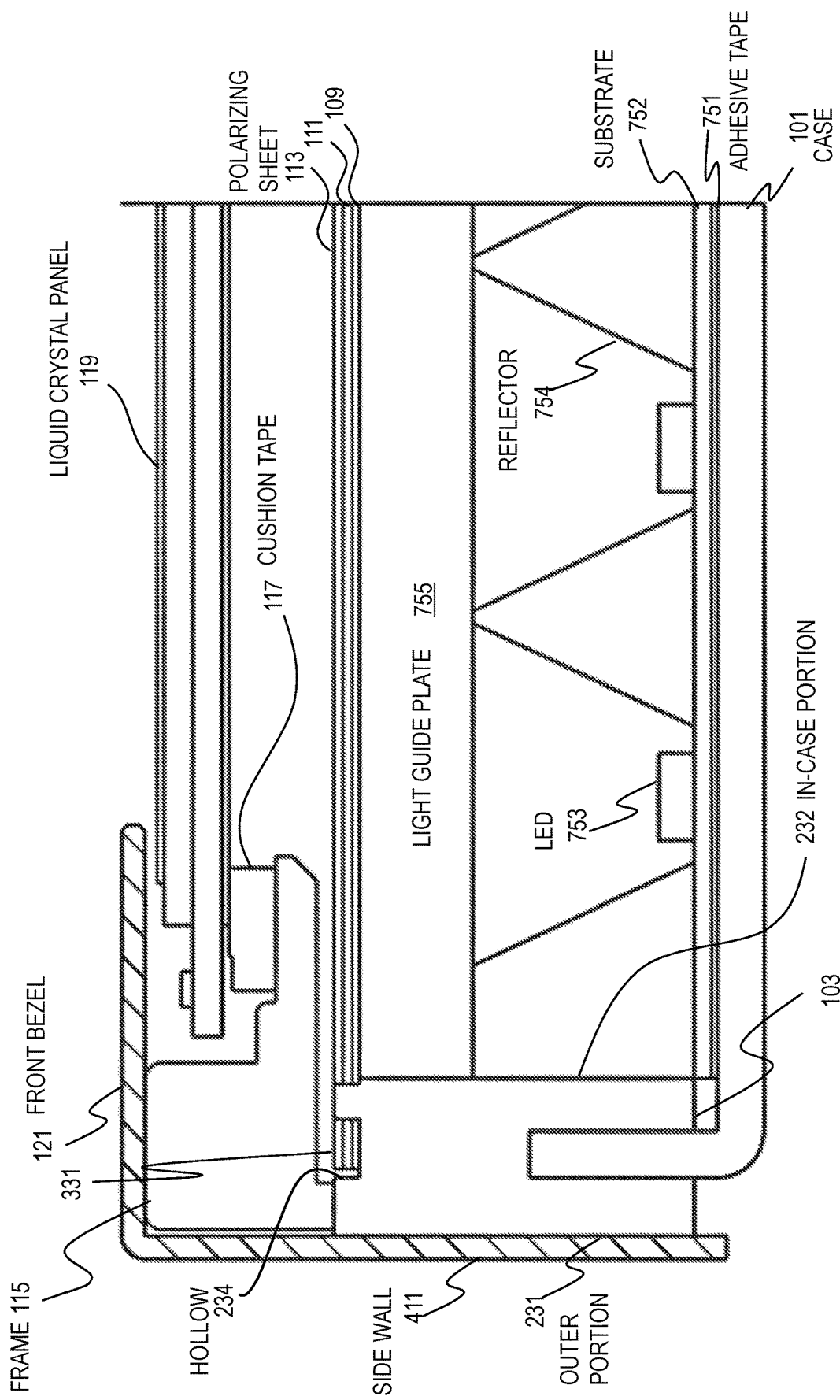
FIG. 17 illustrates another configuration of the backlight unit.

FIG. 17 illustrates another configuration of the backlight unit. FIG. 17 is a cross-sectional view of an example of the backlight including a direct light source. Differences from the configuration example of FIG. 5 will mainly be discussed below. The backlight includes a plurality of LEDs 753 in the position overlapping with the liquid crystal panel 119 viewed from the viewer's side (top side of FIG. 17). The LEDs 753 are installed on the front surface of a substrate 752. The substrate 752 is fixed to the inner bottom surface of the case 101 with an adhesive tape 751.

A reflector 754 is installed on the substrate 752 to reflect light from LEDs 753. The reflector 754 is an optical component. A light guide plate 755 is placed on the reflector 754, on which the optical sheets 109, 111, and 113 are placed. The light guide plate 755 is thicker than optical sheets 109, 111, and 113. The in-case portion 232 of the elastic component 103 is in contact with a side surface of the light guide plate 755 and a side surface of the reflector 754. Direct light from the LEDs 753 and light reflected by the reflector 754 pass through the optical components 755, 109, 111 and 113 and enter the rear surface of the liquid crystal panel 119.

Figure 18:
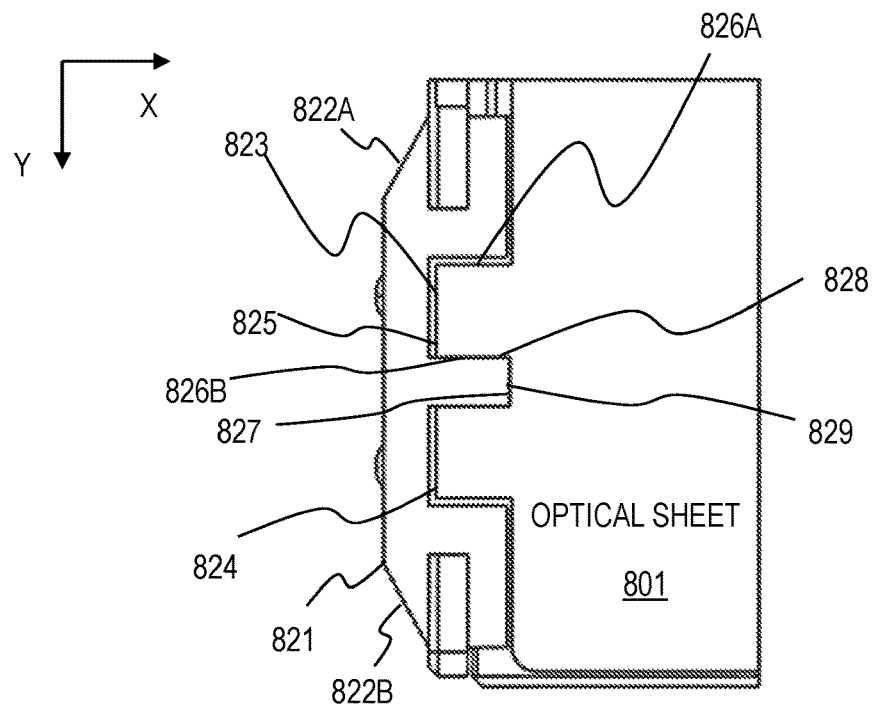
FIG. 18 illustrates a top view of an elastic component and an optical sheet as seen from the front side.

With reference to FIGS. 18 to 30, configuration examples of a recess in the front surface of the elastic component and a tab of an optical sheet that engages with the recess will be explained. In the examples described below, the side of the optical sheet touching the elastic component in the in-plane direction keeps the optical sheet in a fixed position. FIG. 18 illustrates a top view of an elastic component 821 and an optical sheet 801 as seen from the front side. The elastic component 821 has outer tapered surfaces 822A and 822B. The elastic component 821 may further have tapered surfaces on the front and rear sides.

The tab of the optical sheet includes two sections 823 and 824. These sections 823 and 824 are symmetrical with respect to the X-axis with a protrusion 828 of the elastic component 821 interposed therebetween. The protrusion 828 protrudes toward the optical sheet main body in the X direction. Below, the section 823 will mainly be discussed.

The outer shape of the section 823 is defined by sides 825, 826A, and 826B. The side 825 extends in the Y direction, and the sides 826A and 826B extend in the X direction. The side 826B makes contact with a side wall of the protrusion 828, and there is a clearance between the sides 825 and 826A and the inner walls of the recess. Of the three sides defining the outer shape of the section 824, the side opposite to the side 826B is in contact with an side wall of protrusion 828. The other two sides are not in contact with the inner walls of the recess. An end surface 829 of the protrusion 828 is in contact with the optical sheet 801.

Figure 19:
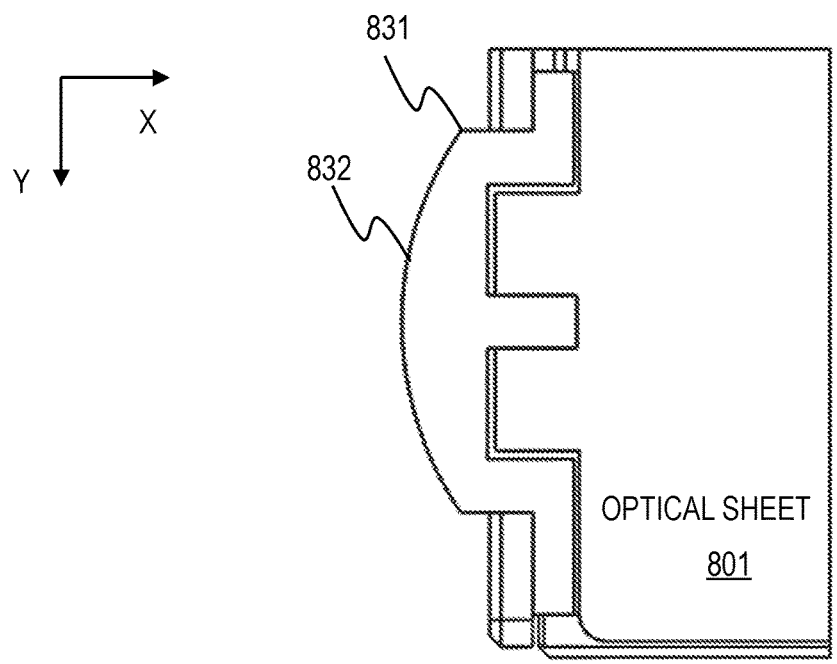
FIG. 19 shows a top view of an elastic component and the optical sheet as seen from the front side.
Figure 20:
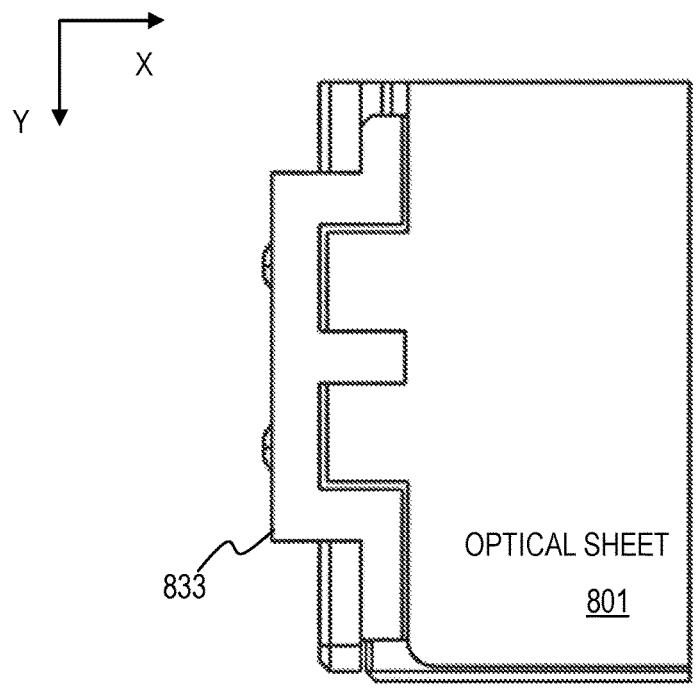
FIG. 20 shows a top view of an elastic component and the optical sheet as seen from the front side.

FIG. 19 shows a top view of an elastic component 831 and the optical sheet 801 as seen from the front side. The elastic component 831 has an outer curved surface 832. The curved surface may have a partial cylindrical shape or a partial spherical shape, for example. The other configurations are the same as those of the elastic component 821 of FIG. 18. FIG. 20 shows a top view of an elastic component 833 and the optical sheet 801 as seen from the front side. The elastic component 833 does not have the tapered surfaces 822A or 822B unlike the elastic component 821 of FIG. 18. The other configurations are the same as those of the elastic component 821 of FIG. 18.

Figure 21:
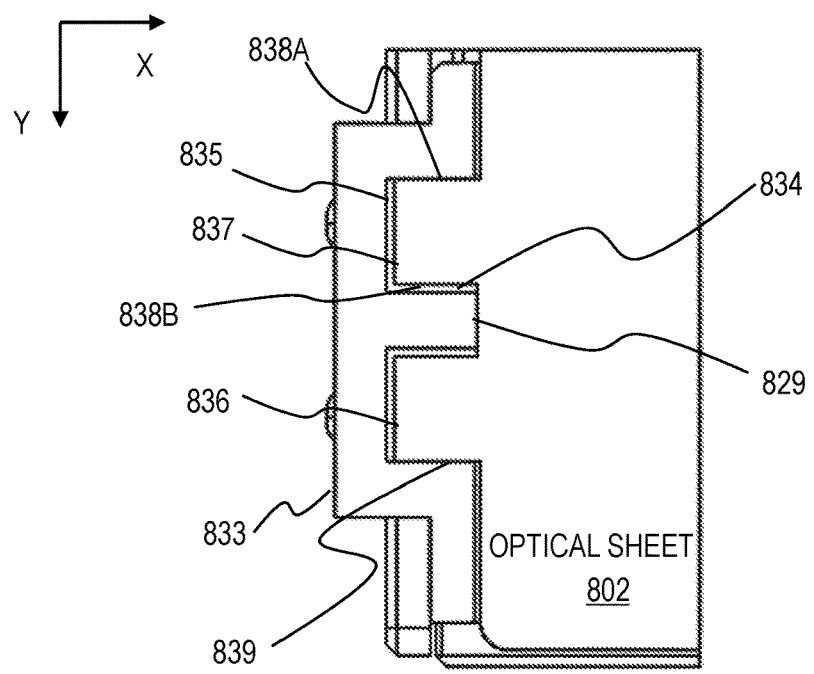
FIG. 21 shows a top view of the elastic component and an optical sheet as seen from the front side.

FIG. 21 shows a top view of the elastic component 833 and an optical sheet 802 as seen from the front side. The tab of the optical sheet 802 includes two sections 835 and 836 in a manner similar to the configuration illustrated in FIG. 18. These sections 835 and 836 are symmetrical with respect to the X-axis with a protrusion 834 of the elastic component 833 interposed therebetween. The protrusion 834 protrudes toward the optical sheet main body in the X direction. Below, the section 835 will mainly be discussed.

The outer shape of the section 835 is defined by sides 837, 838A, and 838B. The side 837 extends in the Y direction, and the sides 838A and 838B extend in the X direction. The side 838B faces the protrusion 834. The side 838A makes contact with an inner wall of the recess of the elastic component 833, and there is a clearance between the sides 837 and 838B and inner walls of the recess.

Of the three sides defining the outer shape of the section 836, the side corresponding to the side 838A is in contact with an inner wall of the recess. The other two sides are not in contact with inner walls of the recess. An end surface 829 of the protrusion 834 is in contact with the optical sheet 802, but not in contact with the respective sides of the sections 835 and 836.

Figure 22:
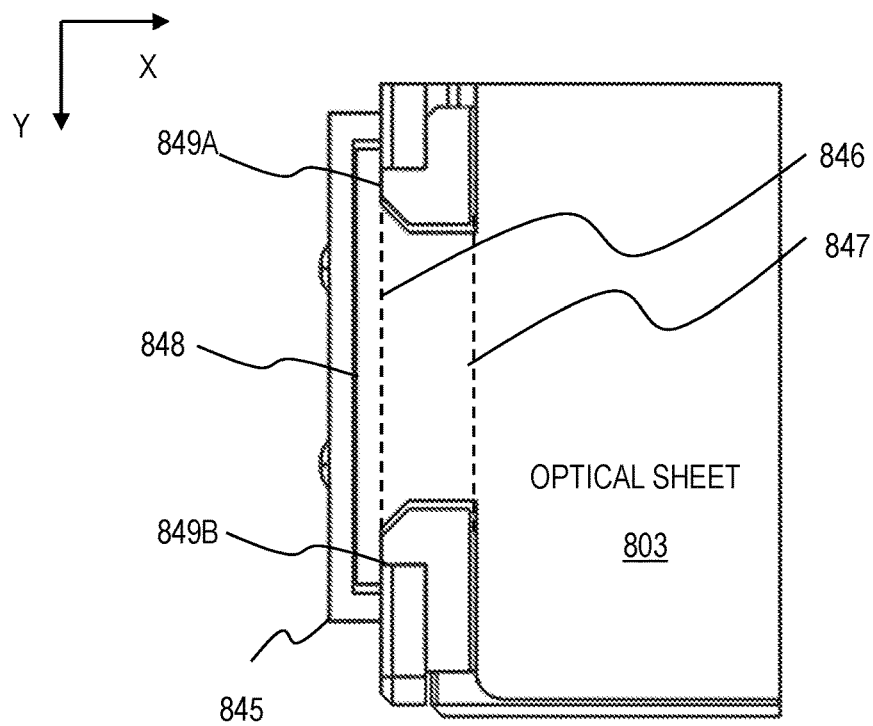
FIG. 22 shows a top view of an elastic component and an optical sheet as seen from the front side.

FIG. 22 shows a top view of an elastic component 845 and an optical sheet 803 as seen from the front side. The tab of the optical sheet includes a wider outer section 846 and a narrower inner section 847. Of the sides that define the outer shape of the tab, sides 848, 849A, and 849B are in contact with the inner walls of the recess, and the other sides are not in contact with the inner walls of the recess. The sides 848, 849A and 849B constitute the section 846 and extend in the Y direction.

Figure 23:
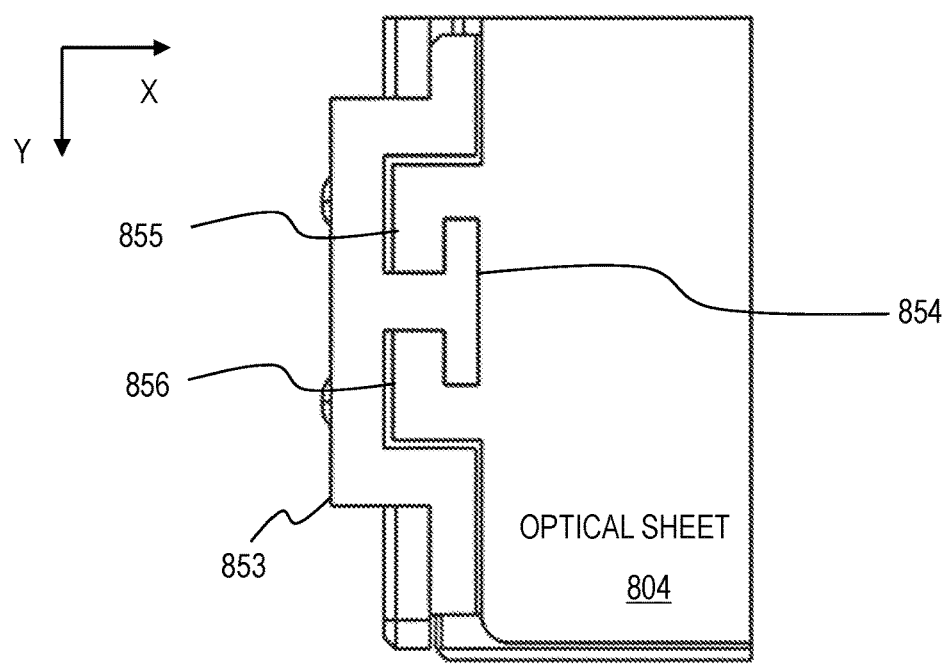
FIG. 23 shows a top view of an elastic component and an optical sheet as seen from the front side.

FIG. 23 shows a top view of an elastic component 853 and an optical sheet 804 as seen from the front side. The elastic component 853 has a protrusion 854 inside the recess. The tab of the optical sheet is in contact with the walls of the protrusion 854, but not touching other walls in the recess. The protrusion 854 is a T-shaped portion, and have two trenches at respective sides. The tab includes L-shaped portions 855 and 856 at respective sides of the protrusion 854. The L-shaped portions 855 and 856 are symmetrical with respect to the X-axis with the protrusion 854 interposed therebetween. The inner surfaces of the trenches that define the protrusion 854 are in contact with the optical sheet 804. There is a clearance between the optical sheet 804 and other inner walls of the recess.

Figure 24:
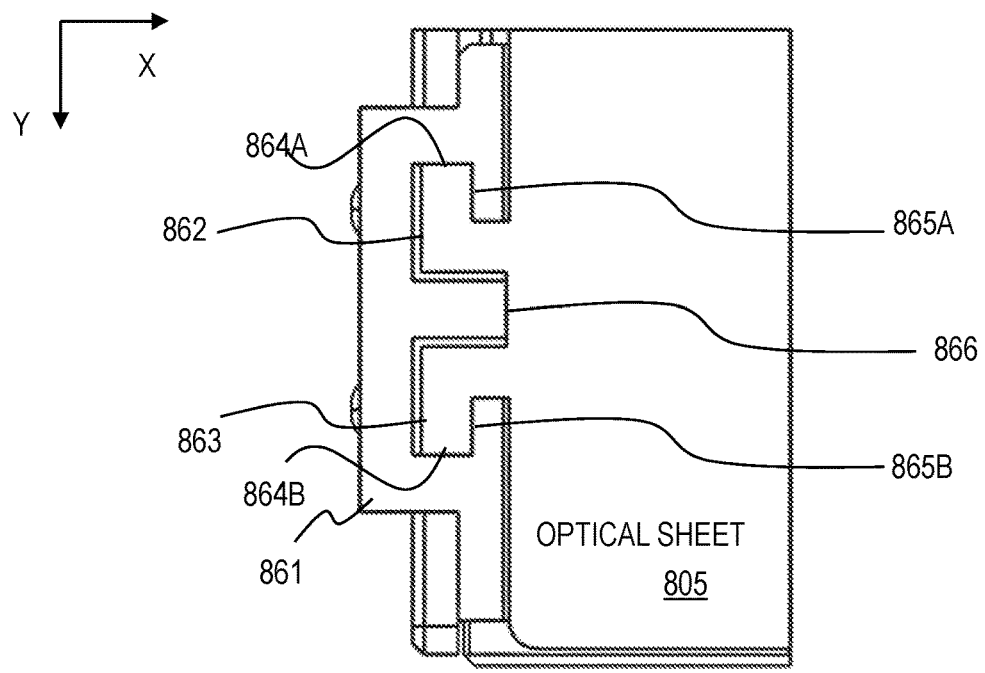
FIG. 24 shows a top view of an elastic component and an optical sheet as seen from the front side.

FIG. 24 shows a top view of an elastic component 861 and an optical sheet 805 as seen from the front side. The elastic component 861 has a protrusion 866 inside the recess. The protrusion 866 is an I-shaped portion, and the end thereof is in contact with the optical sheet 805.

The tab includes L-shaped portions 862 and 863 at respective sides of the protrusion 866. The L-shaped portions 862 and 863 are symmetrical with respect to the X-axis with the protrusion 866 interposed therebetween. There is a clearance between the protrusion 866 and the L-shaped portions 862 and 863. Sides 864A and 865A of the L-shaped portion 862 are in contact with inner walls of the recess. The side 864A extends in X direction, and the side 865A extends in the Y direction. The outermost side of the L-shaped portion 862, or the left side in FIG. 24 is not in contact with an inner wall of the recess.

Sides 864B and 865B of the L-shaped portion 863 are in contact with inner walls of the recess. The side 864B extends in X direction, and the side 865B extends in the Y direction. The outermost side of the L-shaped portion 863, or the left side in FIG. 24 is not in contact with an inner wall of the recess.

Figure 25:
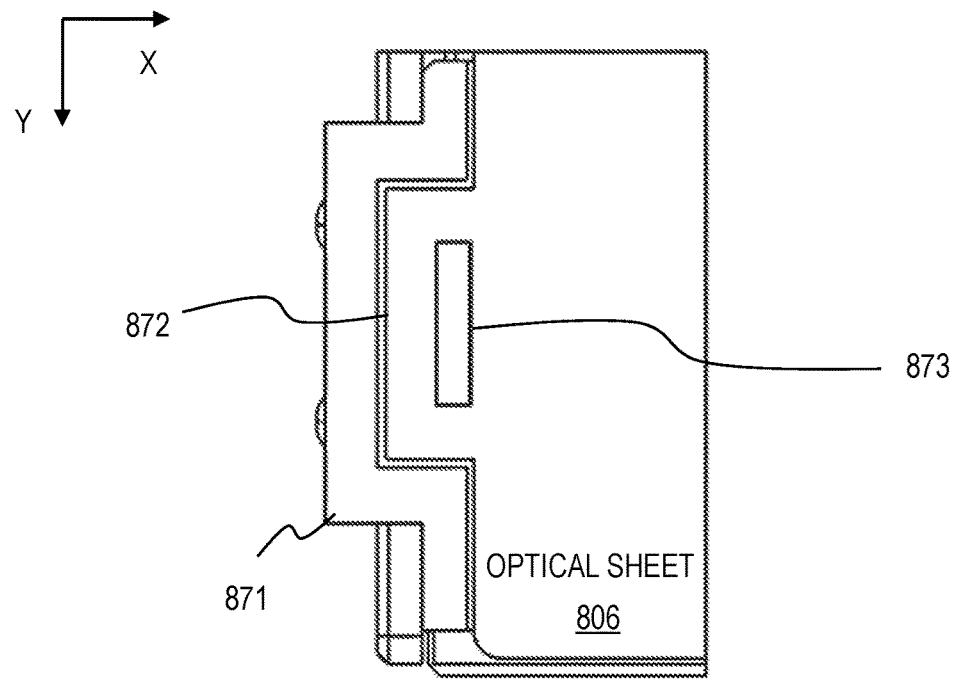
FIG. 25 illustrates a top view of an elastic component and an optical sheet as seen from the front side.

FIG. 25 illustrates a top view of an elastic component 871 and an optical sheet 806 as seen from the front side. A rectangular island portion 873 is present inside the recess of the elastic component 871. The island portion 873 may have any appropriate shape. A tab 872 of the optical sheet 806 is in contact with wall surfaces of the island portion 873. The optical sheet 806 is in contact with the entire periphery of the island portion 873. The tab 872 is not touching the other portions of the inner walls of the recess.

Figure 26:
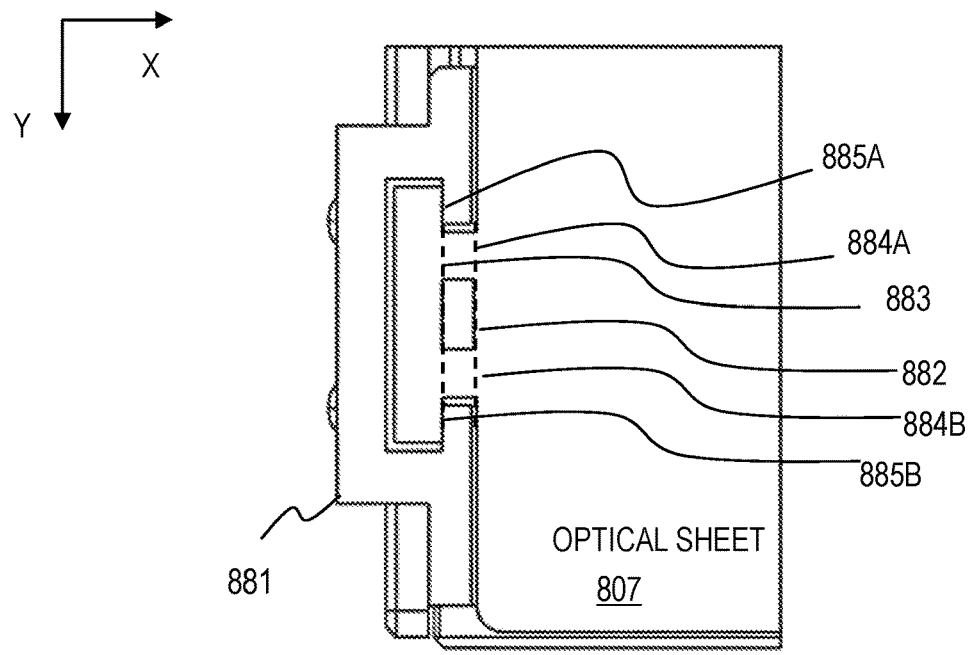
FIG. 26 shows a top view of an elastic component and an optical sheet as seen from the front side.

FIG. 26 shows a top view of an elastic component 881 and an optical sheet 807 as seen from the front side. An island portion 882 is present inside the recess of the elastic component 881. A tab of the optical sheet 807 includes a wider outer portion 883 and narrower inner portions 884A and 884B. The island portion 882 is located between the portions 884A and 884B.

The portions 883, 884A, and 884B are in contact with wall surfaces of the island portion 883. The optical sheet 807 is in contact with the entire periphery of the island portion 883. The portion 883 is in contact with the inner walls of the recess of the elastic component 881 at the sides 885A and 885B extending in the Y direction. Any other sides of the tab are not in contact with the inner walls of the recess.

Figure 27:
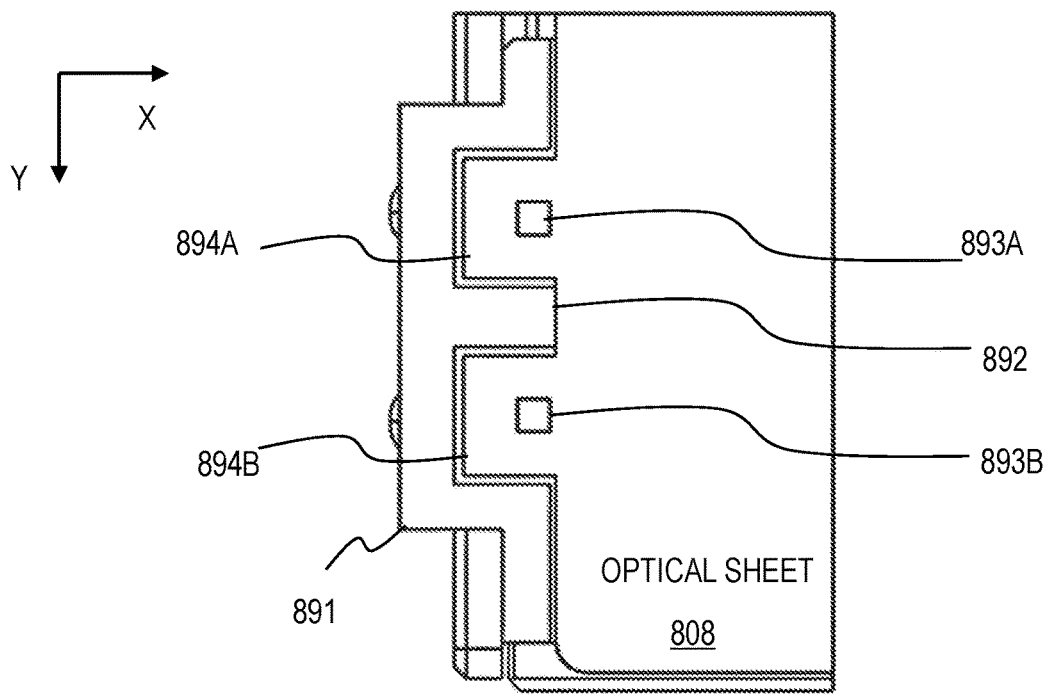
FIG. 27 illustrates a top view of an elastic component and an optical sheet as seen from the front side.

FIG. 27 illustrates a top view of an elastic component 891 and an optical sheet 808 as seen from the front side. A protrusion 892 protruding outwardly, and island portions 893A and 893B are present inside the recess of the elastic component 891. A tab of the optical sheet 808 includes two sections 894A and 894B. These sections 894A and 894B are symmetrical with respect to the X-axis with the protrusion 892 interposed therebetween.

The section 894A is in contact with the outer walls of the island portion 893A, but not in contact with any other inner walls of the recess. The section 894B is in contact with the outer walls of the island portion 893B, but not in contact with any other inner walls of the recess. The end of the protrusion 892 is in contact with the optical sheet 808.

Figure 28:
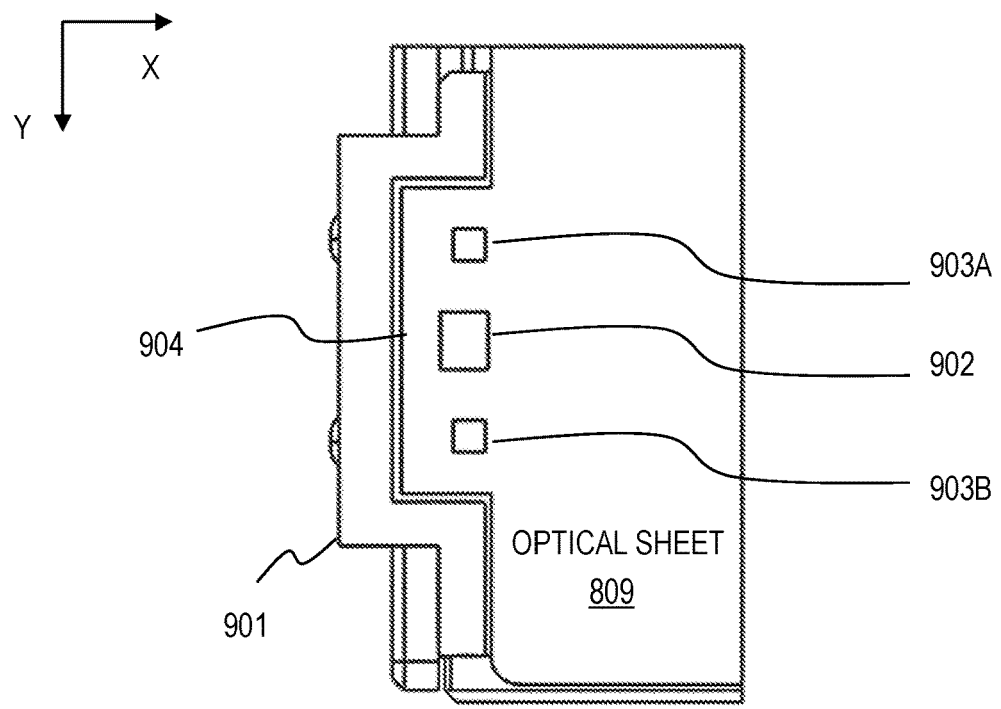
FIG. 28 illustrates a top view of an elastic component and an optical sheet as seen from the front side.

FIG. 28 illustrates a top view of an elastic component 901 and an optical sheet 809 as seen from the front side. Island portions 902, 903A, and 903B are present inside the recess of the elastic component 901. The island portion 902 is larger than the island portions 903A and 903B, and interposed therebetween. A tab 904 of the optical sheet 809 is in contact with the outer walls of the island portions 902, 903A and 903B, but not in contact with any other inner walls of the recess. The entire periphery of each of the island portions 902, 903A, and 903B is in contact with the optical sheet 809.

Figure 29:
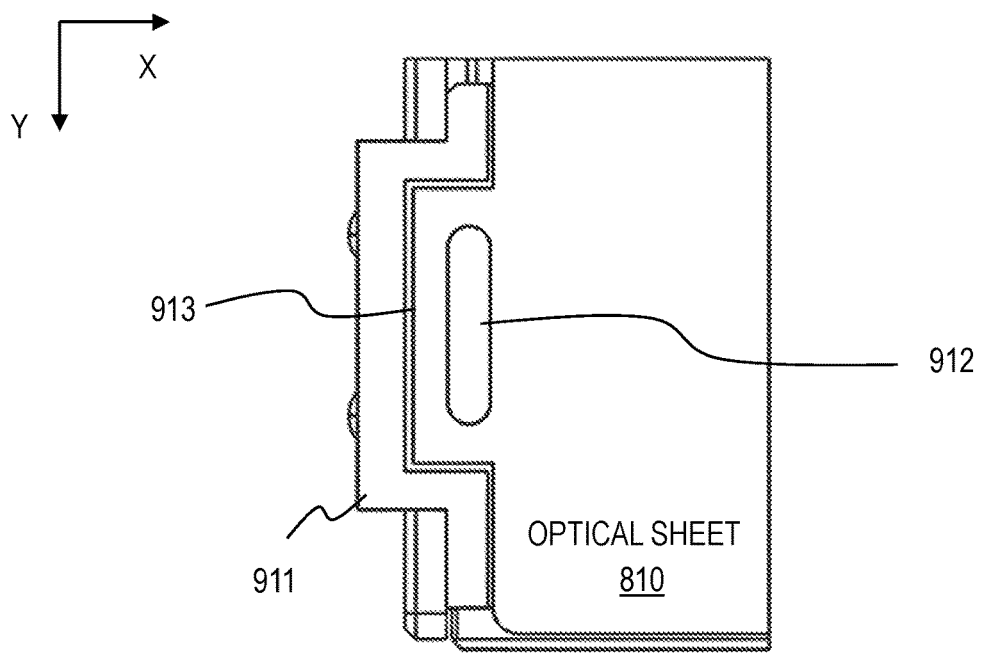
FIG. 29 illustrates a top view of an elastic component and an optical sheet as seen from the front side.

FIG. 29 illustrates a top view of an elastic component 911 and an optical sheet 810 as seen from the front side. An oval island portion 912 is present inside the recess of the elastic component 911. A tab 913 of the optical sheet 810 is in contact with the outer wall of the island portion 912, but not in contact with any other inner walls of the recess. The entire periphery of the island portion 912 is in contact with the optical sheet 810.

Figure 30:
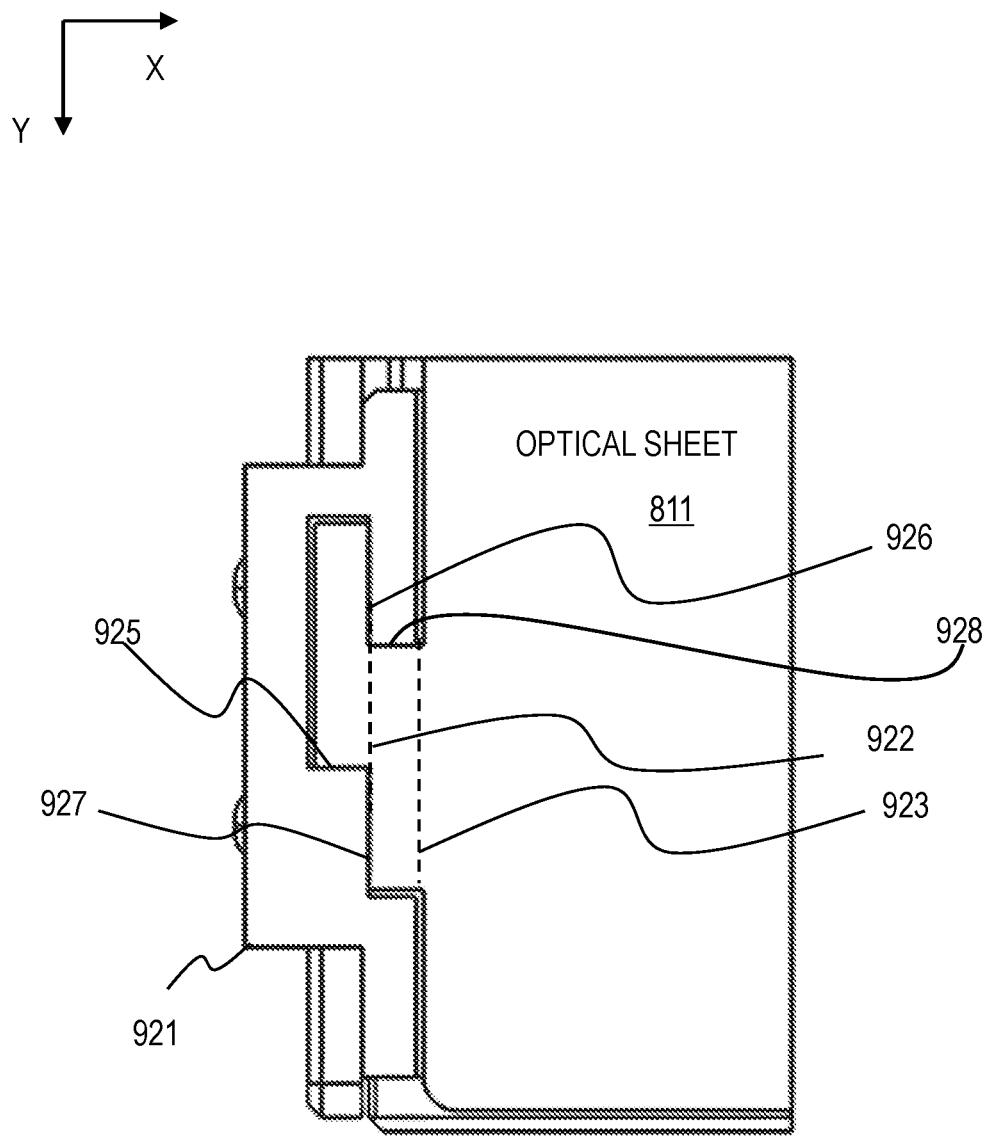
FIG. 30 illustrates a top view of an elastic component and an optical sheet as seen from the front side.

FIG. 30 illustrates a top view of an elastic component 921 and an optical sheet 811 as seen from the front side. A tab of the optical sheet 811 includes a portion 922 and an inner portion 923. The portions 922 and 923 are not aligned with each other in the Y direction, and partially overlapping with each other in the X direction. Sides 925 and 926 of the portion 922 are in contact with inner walls of the recess of the elastic component 921, and the other two sides are not in contact with inner wall of the recess.

Sides 927 and 928 of the portion 923 are in contact with inner walls of the recess of the elastic component 921, and the remaining one side is not in contact with an inner wall of the recess.

The sides 925 and 928 extend in the X direction, and are located at different positions in the Y direction. The side 925 overlaps with the portion 923 in the X direction, and the side 928 overlaps with the portion 922 in the X direction. The sides 926 and 927 extend in the Y direction, and are located at different position in the Y direction.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A liquid crystal display device, comprising:
    a front bezel;
    a backlight unit; and
    a liquid crystal panel between the front bezel and the backlight unit,
    wherein the front bezel includes a periphery portion that surrounds a display area of the liquid crystal panel on a front side of the liquid crystal panel, and
    a side wall that stands from the periphery portion toward a rear side,
    wherein the backlight unit includes
    a case having a bottom plate and a side wall that stands from the bottom plate,
    an optical component placed inside the case, and
    an elastic component that engages with the side wall of the case, making contact with the optical component,
    wherein the side wall of the front bezel is located outside the side wall of the case,
    wherein the elastic component includes an outer portion, and
    wherein the outer portion is positioned between an inner surface of the side wall of the front bezel and an outer surface of the side wall of the case, makes contact with the inner surface of the side wall of the front bezel and the outer surface of the side wall of the case, and presses the inner surface of the side wall of the front bezel and the outer surface of the side wall of the case along an in-plane direction of the display area.

2. The liquid crystal display device according to claim 1, wherein the elastic component engages with the side wall of the case in a recess formed in the side wall of the case.

3. The liquid crystal display device according to claim 1, wherein the backlight unit further includes a frame between the liquid crystal panel and the optical component, and
    wherein the elastic component is in contact with a rear side of the frame and supports the frame.

4. The liquid crystal display device according to claim 3, wherein the outer portion of the elastic component makes contact with the inner surface of the side wall of the front bezel and the outer surface of the side wall of the case through an opening in a side wall of the frame.

5. The liquid crystal display device according to claim 3, wherein the elastic component engages with a side wall of the frame.

6. The liquid crystal display device according to claim 3, wherein a rear surface of the liquid crystal panel is bonded together with a front surface of the frame, and
    wherein the front bezel is not in contact with the front surface of the liquid crystal panel in a normal direction of the liquid crystal panel.

7. The liquid crystal display device according to claim 1, wherein the elastic component has a recess formed in a front surface thereof, and
    wherein the optical component has a tab that is inserted into the recess and engages with an inner wall of the recess.

8. The liquid crystal display device according to claim 1, wherein the elastic component includes a protrusion that makes contact with the inner surface of the side wall of the front bezel.

9. The liquid crystal display device according to claim 1, wherein the elastic component includes a first section that engages with a first side wall of the case, and a second section that engages with a second side wall of the case that differs from the first side wall,
    wherein the first section and the second section make contact with the optical component;
    wherein the first section includes a first outer portion, wherein the first outer portion is positioned between an inner surface of a first side wall of the front bezel and an outer surface of the first side wall of the case, makes contact with the inner surface of the first side wall of the front bezel and the outer surface of the first side wall of the case, and presses the inner surface of the first side wall of the front bezel and the outer surface of the first side wall of the case along the in-plane direction of the display area, wherein the second section includes a second outer portion, and wherein the second outer portion is positioned between an inner surface of a second side wall of the front bezel and an outer surface of the second side wall of the case, makes contact with the inner surface of the second side wall of the front bezel and the outer surface of the second side wall of the case, and presses the inner surface of the second side wall of the front bezel and the outer surface of the second side wall of the case along the in-plane direction of the display area.

* * * * *